United States Patent
Kim et al.

(10) Patent No.: US 12,231,637 B2
(45) Date of Patent: Feb. 18, 2025

(54) IMAGE ENCODING/DECODING METHOD AND DEVICE FOR PERFORMING FEATURE QUANTIZATION/ DE-QUANTIZATION, AND RECORDING MEDIUM FOR STORING BITSTREAM

(71) Applicant: LG ELECTRONICS INC., Seoul (KR)

(72) Inventors: Chul Keun Kim, Seoul (KR); Eunyong Son, Seoul (KR); Yongjoon Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 127 days.

(21) Appl. No.: 17/801,159

(22) PCT Filed: Feb. 25, 2021

(86) PCT No.: PCT/KR2021/002354
§ 371 (c)(1),
(2) Date: Aug. 19, 2022

(87) PCT Pub. No.: WO2021/177652
PCT Pub. Date: Sep. 10, 2021

(65) Prior Publication Data
US 2023/0082561 A1    Mar. 16, 2023

(30) Foreign Application Priority Data

Mar. 2, 2020 (KR) .................. 10-2020-0026183
Mar. 12, 2020 (KR) .................. 10-2020-0030562

(51) Int. Cl.
*H04N 19/124* (2014.01)
*H04N 19/169* (2014.01)

(52) U.S. Cl.
CPC ....... *H04N 19/124* (2014.11); *H04N 19/1883* (2014.11)

(58) Field of Classification Search
CPC ............ H04N 19/124; H04N 19/1883; H04N 19/136; H04N 19/172; H04N 19/186
(Continued)

(56) References Cited

U.S. PATENT DOCUMENTS

| | | | |
|---|---|---|---|
| 2007/0201752 A1* | 8/2007 | Gormish | ............... G06V 30/40 382/232 |
| 2018/0068463 A1* | 3/2018 | Risser | ...................... G06T 7/45 |

(Continued)

FOREIGN PATENT DOCUMENTS

| | | | | |
|---|---|---|---|---|
| WO | 2019/199716 A1 | 10/2019 | | |
| WO | WO-2020177513 A1 * | 9/2020 | ............ | G06N 3/045 |
| WO | WO-2021172956 A1 * | 9/2021 | ........... | H04N 19/167 |

OTHER PUBLICATIONS

Ling-Yu Duan et al., "Video Coding for Machines: A Paradigm of Collaborative Compression and Intelligent Analytics", arXiv:2001.03569v1, Jan. 10, 2020, [Retrieved on May 24, 2021], Retrieved from <URL: https://arxiv.org/pdf/2001.03569v1.pdf>, see pp. 5 and 11; and figure 1.

(Continued)

*Primary Examiner* — Behrooz M Senfi
(74) *Attorney, Agent, or Firm* — Bryan Cave Leighton Paisner LLP

(57) ABSTRACT

An image encoding/decoding method and apparatus are provided. An image decoding method may comprise obtaining, from a bitstream, a feature set extracted from an input image using an artificial neural network-based feature extraction method, first information on importance of each of a plurality of channels included in the feature set and second information on a quantization method of the feature set, decoding the feature set, the first information and the second information, and dequantizing the decoded feature set based on the decoded first information and the decoded second information. The second information may comprise the number of quantization bits of each of the plurality of channels, and the number of quantization bits may be determined based on the importance of each of the plurality of channels.

12 Claims, 20 Drawing Sheets

(58) Field of Classification Search
USPC .................................................. 375/240.03
See application file for complete search history.

(56) References Cited

U.S. PATENT DOCUMENTS

2018/0332301 A1* 11/2018 Tian ...................... G06F 18/213
2019/0139175 A1   5/2019 Holub et al.
2021/0266565 A1*  8/2021 Zhou .................... H04N 19/124

OTHER PUBLICATIONS

Yueyu Hu et al., "Towards Coding for Human and Machine Vision: A Scalable Image Coding Approach", arXiv:2001.02915v1, Jan. 9, 2020, [Retrieved on May 24, 2021], Retrieved from <URL: https://arxiv.org /pdf/2001.02915v1.pdf>, see section 3.2; and figure 1.
Sifeng Xia et al., "An Emerging Coding Paradigm VCM: A Scalable Coding Approach Beyond Feature and Signal", arXiv:2001.03004v1, Jan. 9, 2020, [Retrieved on May 24, 2021], Retrieved from <URL: https ://arxiv.org/pdf/2001.03004v1.pdf>, see sections 2-2.3; and figures 2-3.

* cited by examiner

FIG. 9A

B channel

| 211 | 103 | 60 | 32 | 155 | 123 | 76 |

G channel

| 231 | 159 | 197 | 134 | 99 | 34 | 69 | 20 |

R channel

| 253 | 144 | 120 | 251 | 41 | 55 | 56 | 110 | 57 |
| 244 | 233 | 10 | 15 | 16 | 22 | 30 | 155 | 25 |
| 250 | 240 | 235 | 22 | 50 | 52 | 60 | 34 | 69 |
| 201 | 233 | 210 | 32 | 44 | 62 | 22 | 66 | 87 |
| 211 | 198 | 27 | 64 | 89 | 57 | 32 | 147 | 117 |
| 125 | 187 | 28 | 23 | 2 | 3 | 17 | 153 |
| 133 | 176 | 19 | 17 | 11 | 0 | 16 |

NUMBER OF CHANNELS    3
RANGE OF VALUE    0~255
DATA TYPE    8bit INTEGER
<8-bit RGB format image>

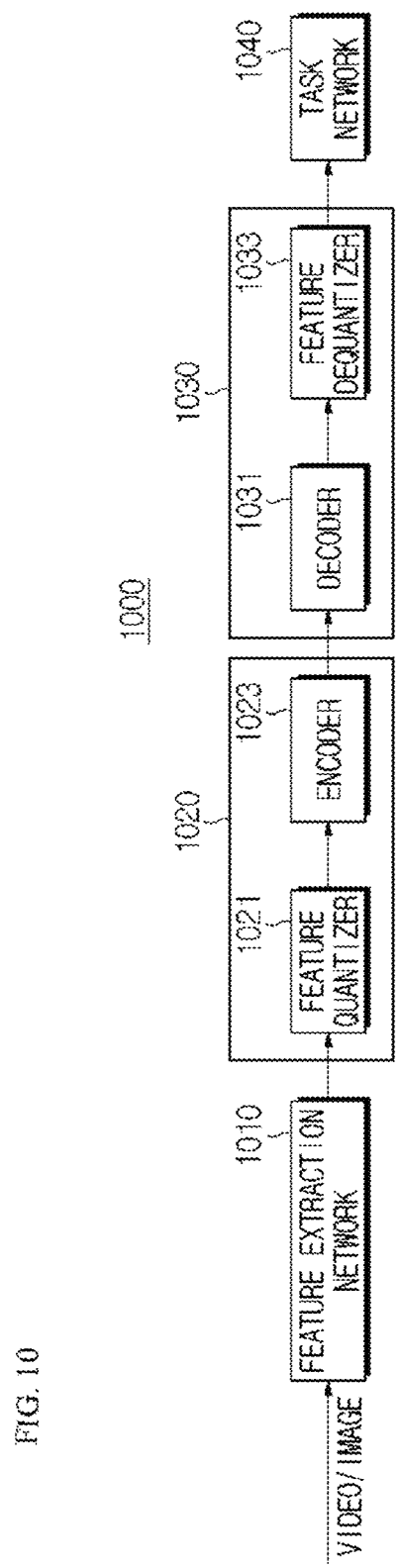

FIG. 11
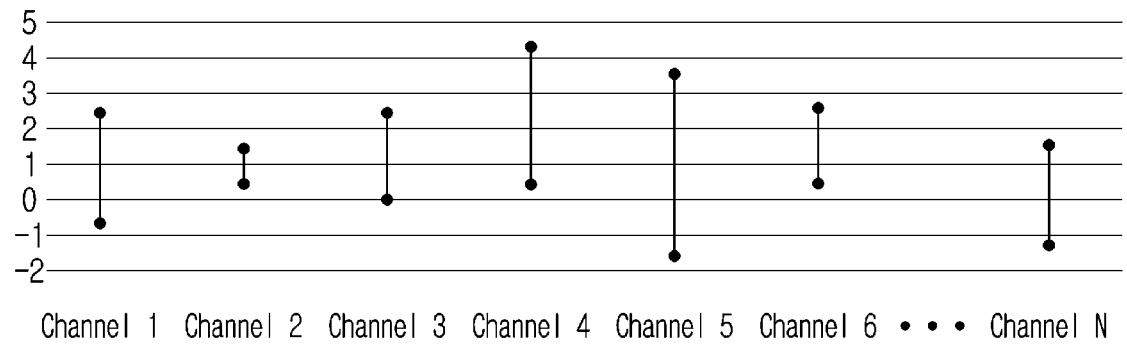
FIG. 12
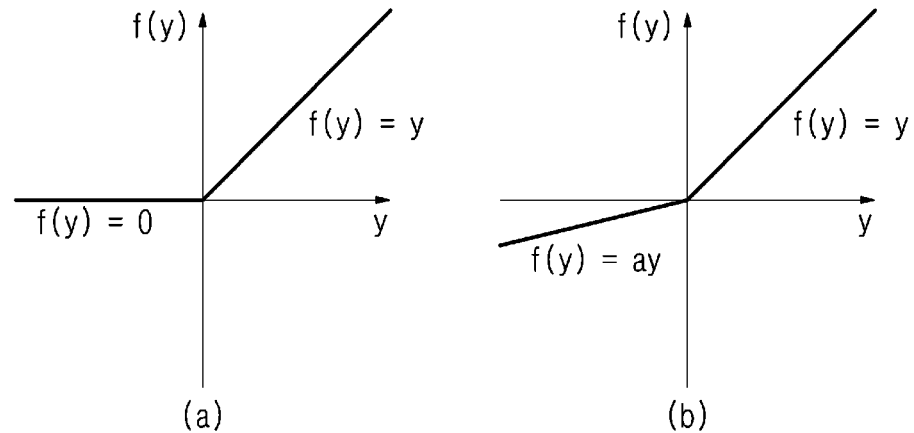
(a)    (b)
FIG. 13
| feature_set_header( ) { | Descriptor |
|---|---|
| ... | |
|    activation_function_type | |
|    quant_bit | |
|    if ( activation_function_type == leaky_relu ) { | |
|       min_value | |
|    } | |
|    max_value | |
| ... | |
| } | |

| feature_set_header( ) { | Descriptor |
|---|---|
| ... | |
|   global_quant | |
|   activation_function_type | |
|   if ( global_quant ) | |
|     quant_bit | |
|   for ( i=0; i<num_channels; i++ ) { | |
|     if ( !global_quant ) | |
|       quant_bit[i] | |
|     if ( activation_function_type == leaky_relu ) | |
|       min_value[i] | |
|       max_value[i] | |
|   } | |
| ... | |
| } | |

FIG. 16

| feature_set_header( ) { | Descriptor |
|---|---|
| ... | |
|   global_quant | |
|   activation_function_type | |
|   if ( global_quant ) | |
|     quant_bit | |
|   num_quant_group | |
|   for ( i=0; i<num_quant_group; i++ ) { | |
|     if ( !global_quant ) | |
|       quant_bit[i] | |
|     if ( activation_function_type == leaky_relu ) | |
|       min_value[i] | |
|     max_value[i] | |
|   } | |
|   for ( i=0; i<num_channels; i++ ) { | |
|     quant_group_idx[i] | |
|   } | |
| ... | |
| } | |

FIG. 20
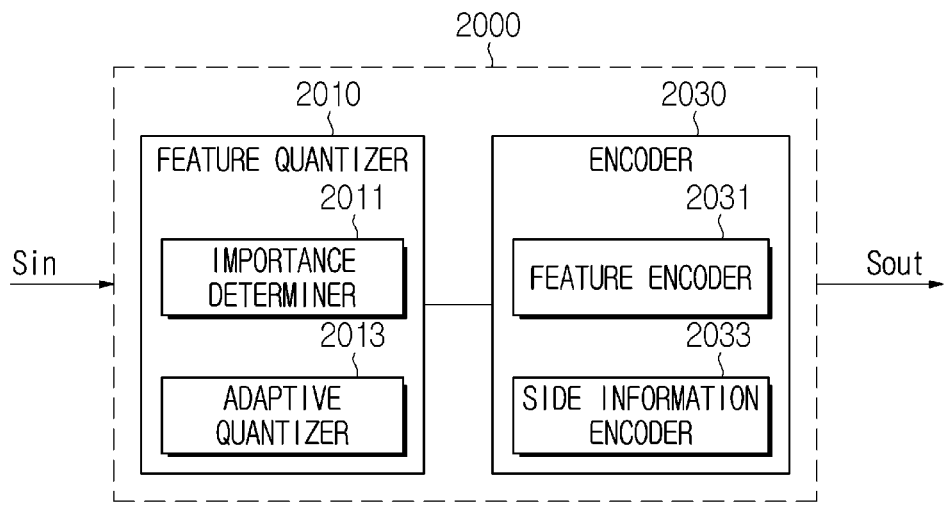
FIG. 21
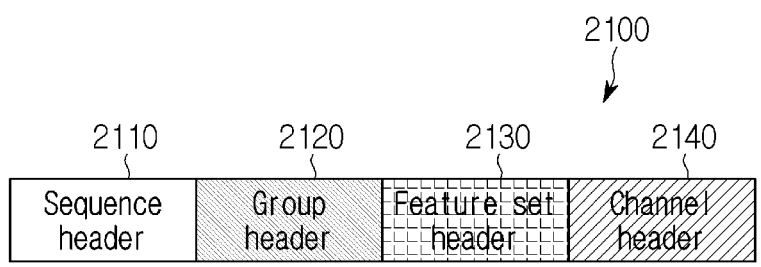
FIG. 22
| Sequence_header( ) { | Descriptor |
|---|---|
| ... | |
| Adaptive_quantization | |
| if(Adaptive_quantization) | |
| { | |
|    Sequence_level | |
| } | |
| if(Sequence_level) | |
| { | |
|    Side_info | |
|    IM | |
| } | |
| ... | |
| } | |

FIG. 23

| GOF_header( ) { | Descriptor |
|---|---|
| ... | |
| if(Adaptive_quantization) | |
| { | |
|   if(!Sequence_level) | |
|     GOF_level | |
| } | |
| if(GOF_level) | |
| { | |
|   Side_info | |
|   IM | |
|   GOF_Info | |
| } | |
| ... | |
| } | |

FIG. 24

| FeatureSet_header( ) { | Descriptor |
|---|---|
| ... | |
| if(Adaptive_quantization) | |
| { | |
|   if(!Sequence_level && !GOF_level) | |
|     FeatureSet_level | |
| } | |
| if(FeatureSet_level) | |
| { | |
|   Side_info | |
|   IM | |
| } | |
| ... | |
| } | |

| Channel_header( ) { | Descriptor |
|---|---|
| ... | |
|   if(Adaptive_quantization) | |
|   { | |
|     if(!Sequence_level && !GOF_level && !FeatureSet_level) | |
|       Channel_level | |
|   } | |
|   if(Channel_level) | |
|   { | |
|     Side_info | |
|     IM | |
|   } | |
|   ... | |
| } | |

IMAGE ENCODING/DECODING METHOD AND DEVICE FOR PERFORMING FEATURE QUANTIZATION/ DE-QUANTIZATION, AND RECORDING MEDIUM FOR STORING BITSTREAM

This application is a National Stage Application of International Application No. PCT/KR2021/002354, filed on Feb. 25, 2021, which claims the benefit of and priority to Korean Application No. 10-2020-0026183, filed on Mar. 2, 2020 and Korean Application No. 10-2020-0030562, filed on Mar. 12, 2020, which are hereby incorporated by reference in their entirety for all purposes as if fully set forth herein.

TECHNICAL FIELD

The present disclosure relates to an image encoding/decoding method and apparatus, and, more particularly, to an image encoding/decoding method and apparatus for performing feature quantization/dequantization, and a recording medium storing a bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

Another object of the present disclosure is to provide an image encoding/decoding method and apparatus for performing feature quantization/dequantization.

Another object of the present disclosure is to provide an image encoding/decoding method and apparatus with improved signaling efficiency of feature quantization-related information.

Another object of the present disclosure is to provide a method of transmitting a bitstream generated by an image encoding method or apparatus.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

Technical Solution

An image decoding method according to an aspect of the present disclosure may comprise obtaining, from a bitstream, a feature set extracted from an input image using an artificial neural network-based feature extraction method, first information on importance of each of a plurality of channels included in the feature set and second information on a quantization method of the feature set, decoding the feature set, the first information and the second information, and dequantizing the decoded feature set based on the decoded first information and the decoded second information. The second information may comprise the number of quantization bits of each of the plurality of channels, and the number of quantization bits may be determined based on the importance of each of the plurality of channels.

An image decoding apparatus according to another aspect of the present disclosure may comprise a memory and at least one processor. The at least one processor may obtain, from a bitstream, a feature set extracted from an input image using an artificial neural network-based feature extraction method, first information on importance of each of a plurality of channels included in the feature set and second information on a quantization method of the feature set, decode the feature set, the first information and the second information, and dequantize the decoded feature set based on the decoded first information and the decoded second information. The second information may comprise the number of quantization bits of each of the plurality of channels, and the number of quantization bits may be determined based on the importance of each of the plurality of channels.

An image encoding method according to another aspect of the present disclosure may comprise extracting a feature set comprising a plurality of channels from an input image using an artificial neural network-based feature extraction method, determining a quantization method of the feature set, based on importance of each of the plurality of channels, quantizing the feature set based on the determined quantization method, and encoding the quantized feature set, first information on the importance and second information on the quantization method. The second information may comprise the number of quantization bits of each of the plurality of channels, and the number of quantization bits may be determined based on the importance of each of the plurality of channels.

In addition, a computer-readable recording medium according to another aspect of the present disclosure may store the bitstream generated by the image encoding apparatus or the image encoding method of the present disclosure.

In addition, a transmission method according to another aspect of the present disclosure may transmit a bitstream generated by the image encoding apparatus or the image encoding method of the present disclosure to an image decoding apparatus.

The features briefly summarized above with respect to the present disclosure are merely exemplary aspects of the detailed description below of the present disclosure, and do not limit the scope of the present disclosure.

Advantageous Effects

According to the present disclosure, it is possible to provide an image encoding/decoding method and apparatus with improved encoding/decoding efficiency.

Also, according to the present disclosure, it is possible to provide an image encoding/decoding method and apparatus for performing feature quantization/dequantization.

Also, according to the present disclosure, it is possible to provide an image encoding/decoding method and apparatus with improved signaling efficiency of feature quantization-related information.

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

DESCRIPTION OF DRAWINGS

FIG. 9A is a view illustrating data distribution characteristics of a video source.

FIG. 10 is a view illustrating a VCM system for performing feature quantization/dequantization according to an embodiment of the present disclosure.

FIG. 11 is a view exemplarily illustrating a range of feature element values for each channel constituting a feature set.

FIG. 12 is a view exemplarily illustrating a data distribution range of a feature set according to the type of an activation function.

FIG. 13 is a view illustrating an example of a feature set header according to an embodiment of the present disclosure.

FIG. 16 is a view illustrating an example of a feature set header according to an embodiment of the present disclosure.

FIG. 20 is a view illustrating a feature encoding apparatus according to an embodiment of the present disclosure.

FIG. 21 is a view illustrating a hierarchical structure of an encoded feature set.

FIG. 22 is a view illustrating an example of a sequence header according to an embodiment of the present disclosure.

FIG. 23 is a view illustrating an example of a group header according to an embodiment of the present disclosure.

FIG. 24 is a view illustrating an example of a feature set header according to an embodiment of the present disclosure.

MODE FOR INVENTION

Figure 1:
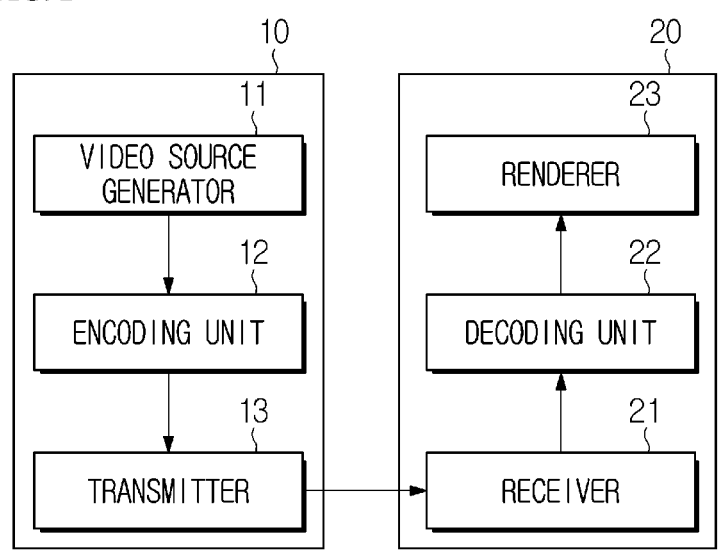
FIG. 1 is a view schematically showing a video coding system, to which embodiments of the present disclosure are applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, in case it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

The present disclosure may be applied to a method disclosed in a Versatile Video Coding (VVC) standard and/or a Video Coding for Machines (VCM) standard. In addition, the present disclosure may be applied to a method disclosed in an essential video coding (EVC) standard, AOMedia Video 1 (AV1) standard, 2nd generation of audio video coding standard (AVS2), or a next-generation video/image coding standard (e.g., H.267 or H.268, etc.).

This disclosure provides various embodiments related to video/image coding, and, unless otherwise stated, the embodiments may be performed in combination with each other. In the present disclosure, "video" refers to a set of a series of images according to the passage of time. An "image" may be information generated by artificial intelligence (AI). Input information used in the process of performing a series of tasks by AI, information generated during the information processing process, and the output information may be used as images. In the present disclosure, a "picture" generally refers to a unit representing one image in a specific time period, and a slice/tile is a coding unit constituting a part of a picture in encoding. One picture may be composed of one or more slices/tiles. In addition, a slice/tile may include one or more coding tree units (CTUs). The CTU may be partitioned into one or more CUs. A tile is a rectangular region present in a specific tile row and a specific tile column in a picture, and may be composed of a plurality of CTUs. A tile column may be defined as a rectangular region of CTUs, may have the same height as a picture, and may have a width specified by a syntax element signaled from a bitstream part such as a picture parameter set. A tile row may be defined as a rectangular region of CTUs, may have the same width as a picture, and may have a height specified by a syntax element signaled from a bitstream part such as a picture parameter set. A tile scan is a certain continuous ordering method of CTUs partitioning a picture. Here, CTUs may be sequentially ordered according to a CTU raster scan within a tile, and tiles in a picture may be sequentially ordered according to a raster scan order of tiles of the picture. A slice may contain an integer number of complete tiles, or may contain a continuous integer number of complete CTU rows within one tile of one picture. A slice may be exclusively included in a single NAL unit. One picture may be composed of one or more tile groups. One tile group may include one or more tiles. A brick may indicate a rectangular region of CTU rows within a tile in a picture. One tile may include one or more bricks. The brick may refer to a rectangular region of CTU rows in a tile. One tile may be split into a plurality of bricks, and each brick may include one or more CTU rows belonging to a tile. A tile which is not split into a plurality of bricks may also be treated as a brick.

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In an embodiment, especially when applied to VCM, when there is a picture composed of a set of components having different characteristics and meanings, a pixel/pixel value may represent a pixel/pixel value of a component generated through independent information or combination, synthesis, and analysis of each component. For example, in RGB input, only the pixel/pixel value of R may be represented, only the pixel/pixel value of G may be represented, or only the pixel/pixel value of B may be represented. For example, only the pixel/pixel value of a luma component synthesized using the R, G, and B components may be represented. For example, only the pixel/pixel values of images and information extracted through analysis of R, G, and B components from components may be represented.

In the present disclosure, a "unit" may represent a basic unit of image processing. The unit may include at least one of a specific region of the picture and information related to the region. One unit may include one luma block and two chroma (e.g., Cb and Cr) blocks. The unit may be used interchangeably with terms such as "sample array", "block" or "area" in some cases. In a general case, an MxN block may include samples (or sample arrays) or a set (or array) of transform coefficients of M columns and N rows. In an embodiment, In particular, especially when applied to VCM, the unit may represent a basic unit containing information for performing a specific task.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean "a luma block of a current block" unless explicitly stated as a chroma block. The "chroma block of the current block" may be expressed by including an explicit description of a chroma block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view illustrating a video coding system, to which embodiments of the present disclosure are applicable.

The video coding system according to an embodiment may include a source device 10 and a reception device 20. The source device 10 may transmit encoded video and/or image information or data to the reception device 20 in the form of a file or streaming via a digital storage medium or network.

The source device 10 according to an embodiment may include a video source generator 11, an encoder 12 and a transmitter 13. The reception device 20 according to an embodiment may include a receiver 21, a decoder 22 and a renderer 23. The encoder 12 may be called a video/image encoding device, and the decoding device 22 may be called a video/image decoding device. The transmitter 13 may be included in the encoder 12. The receiver 21 may be included in the decoder 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data. In an embodiment, video/image synthesis and generation may be performed during an information processing process (AI input information, information in image processing, output information) by AI. In this case, information generated in the video/image capture process may be utilized as input information of AI.

The encoder 12 may encode an input video/image. The encoder 12 may perform a series of procedures such as prediction, transform, and quantization for compression and coding efficiency. The encoder 12 may output encoded data (encoded video/image information) in the form of a bitstream.

The transmitter 13 may transmit the encoded video/image information or data output in the form of a bitstream to the receiver 21 of the reception device 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoder 22.

The decoder 22 may decode the video/image by performing a series of procedures such as dequantization, inverse transform, and prediction corresponding to the operation of the encoder 12.

The renderer 23 may render the decoded video/image. The rendered video/image may be displayed through the display.

The decoded video may be used not only for rendering but also as input information for use in other systems. For example, the decoded video may be utilized as input information for performing AI tasks. For example, the decoded video may be utilized as input information for performing AI tasks such as face recognition, behavior recognition, and lane recognition.

Overview of Image Encoding Apparatus

Figure 2:
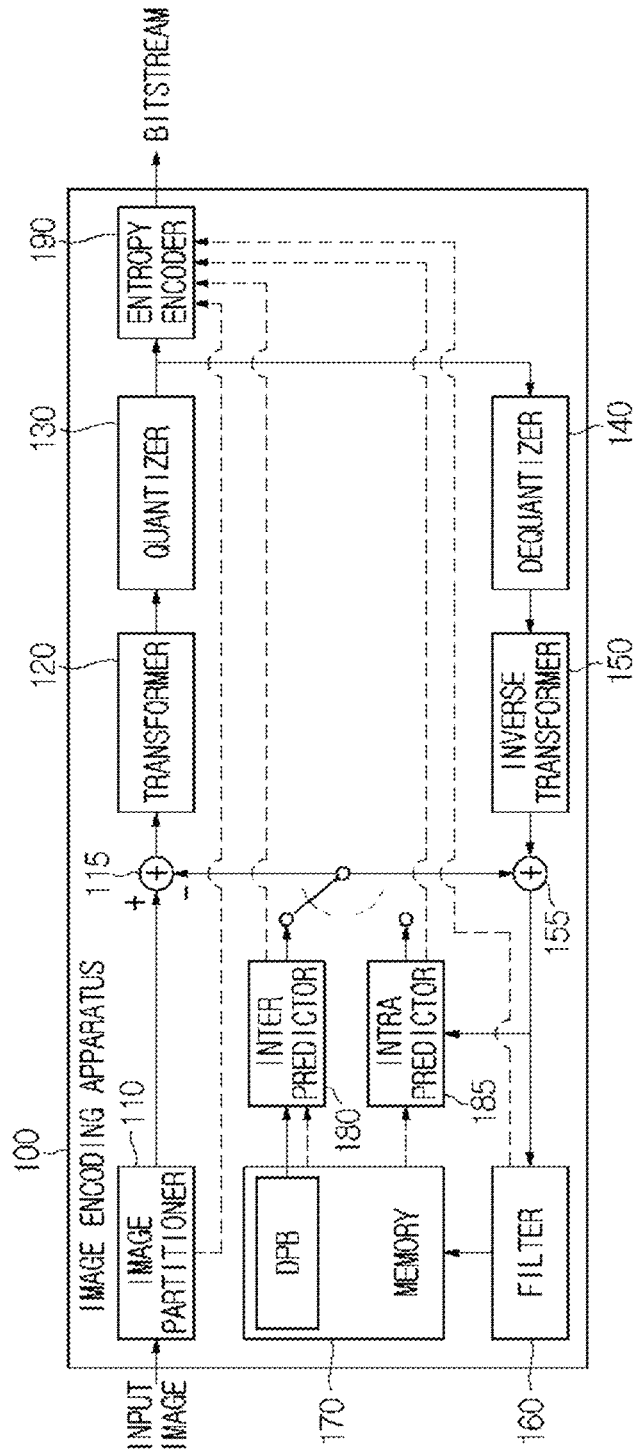
FIG. 2 is a view schematically showing an image encoding apparatus, to which embodiments of the present disclosure are applicable.

FIG. 2 is a view schematically showing an image encoding apparatus, to which embodiments of the present disclosure are applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. Here, the input image may be a normal image obtained by an image sensor and/or an image generated by AI. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, B1 prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. In IBC, prediction is basically performed in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loeve transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block form into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In addition, the video/image information may include a method of generating and using encoded information, a purpose, and the like. For example, especially when applied to VCM, the video/image information may include information indicating which AI task the encoded information is encoded for, and which network (e.g. neural network) is used to encode the encoded information, and/or information indicating for what purpose the encoded information is encoded.

Information and/or syntax elements transmitted/signaled from the encoding apparatus of the present disclosure to the decoding apparatus may be included in video/image information. The signaled information, transmitted information and/or syntax elements described in the present disclosure may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). In case there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
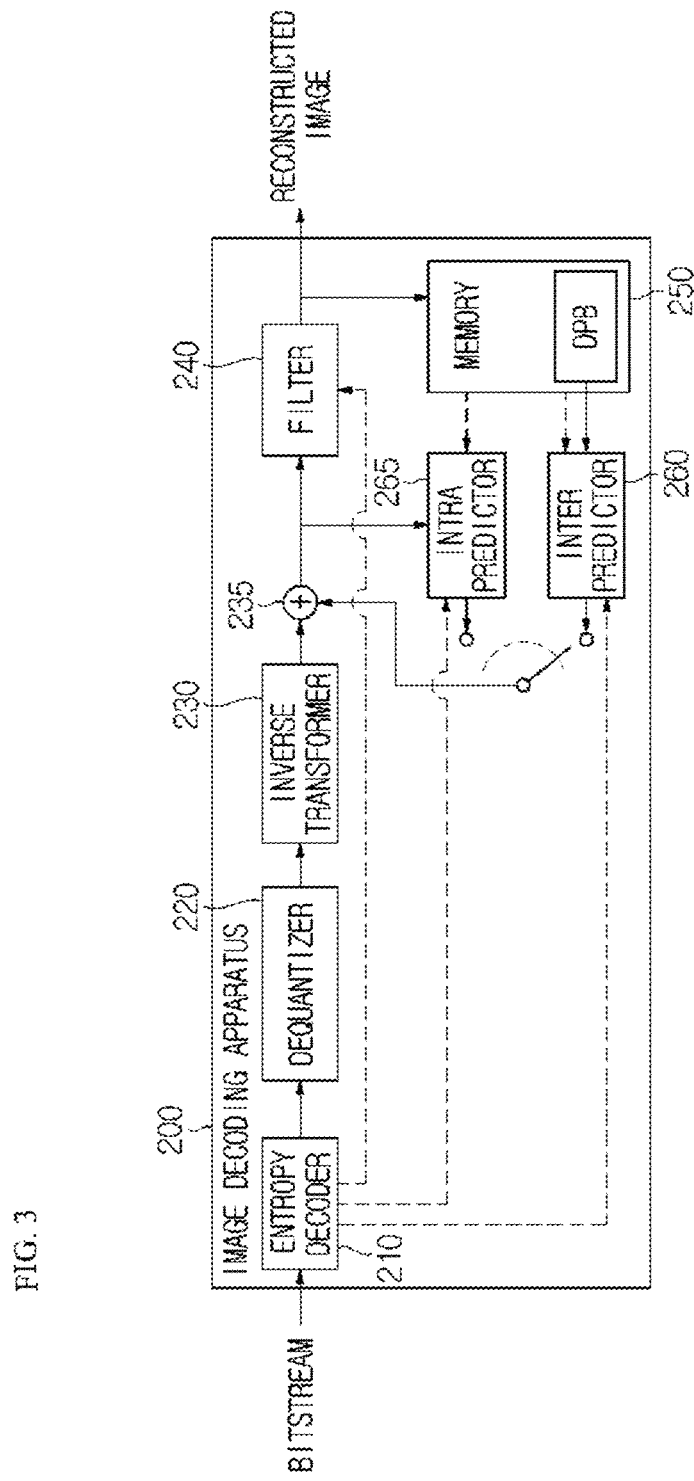
FIG. 3 is a view schematically showing an image decoding apparatus, to which embodiments of the present disclosure are applicable.

FIG. 3 is a view schematically showing an image decoding apparatus, to which embodiments of the present disclosure are applicable.

As shown in FIG. 3, the image decoding apparatus 200 may include an entropy decoder 210, a dequantizer 220, an inverse transformer 230, an adder 235, a filter 240, a memory 250, an inter prediction unit 260 and an intra prediction unit 265. The inter prediction unit 260 and the intra prediction unit 265 may be collectively referred to as a "prediction unit". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 170 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. For example, especially when applied to VCM, the video/image information may include information indicating which AI task the encoded information is encoded for, and which network (e.g. neural network) is used to encode the encoded information, and/or information indicating for what purpose the encoded information is encoded. In an embodiment, even if the corresponding image is an image having general characteristics having a general task, network, and/or use, a value thereof shall be described.

The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter prediction unit 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 260 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra prediction unit 265 may predict the current block by referring to the samples in the current picture. The description of the intra prediction unit 185 is equally applied to the intra prediction unit 265.

The inter prediction unit 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter prediction unit 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter prediction unit 260 and/or the intra prediction unit 265). The description of the adder 155 is equally applicable to the adder 235. In case there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter prediction unit 260. The memory 250 may store the motion information of the block from which the motion information in the current picture is derived (or decoded) and/or the motion information of the blocks in the picture that have already been reconstructed. The stored motion information may be transmitted to the inter prediction unit 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied to the filter 240, the inter prediction unit 260, and the intra prediction unit 265 of the image decoding apparatus 200.

General Image/Video Coding Procedure

In image/video coding, a picture configuring an image/video may be encoded/decoded according to a decoding order. A picture order corresponding to an output order of the decoded picture may be set differently from the decoding order, and, based on this, not only forward prediction but also backward prediction may be performed during inter prediction.

Figure 4:
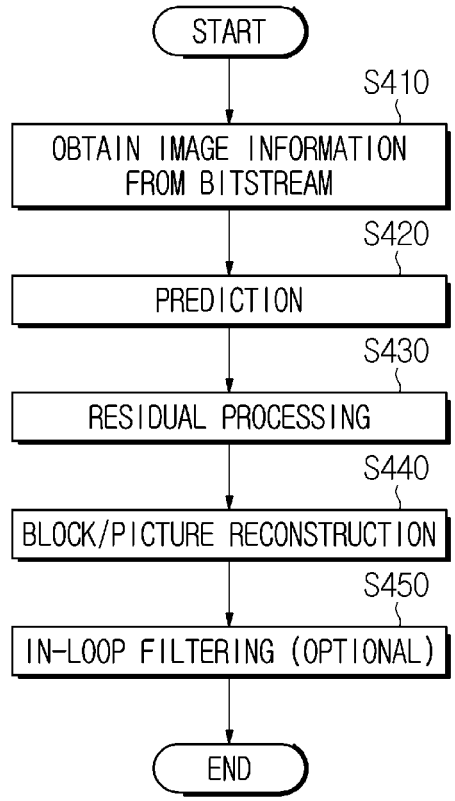
FIG. 4 is a flowchart schematically illustrating a picture decoding procedure, to which embodiments of the present disclosure are applicable.

FIG. 4 is a flowchart schematically illustrating a picture decoding procedure, to which embodiments of the present disclosure are applicable. In FIG. 4, S410 may be performed in the entropy decoder 210 of the decoding apparatus described above with reference to FIG. 3, S420 may be performed in a prediction unit including the intra prediction unit 265 and the inter prediction unit 260, S430 may be performed in a residual processor including the dequantizer 220 and the inverse transformer 230, S440 may be performed in the adder 235, and S450 may be performed in the filter 240. S410 may include the information decoding procedure described in the present disclosure, S420 may include the inter/intra prediction procedure described in the present disclosure, S430 may include a residual processing procedure described in the present disclosure, S440 may include the block/picture reconstruction procedure described in the present disclosure, and S450 may include the in-loop filtering procedure described in the present disclosure.

Referring to FIG. 4, the picture decoding procedure may schematically include a procedure for obtaining image/video information (through decoding) from a bitstream (S410), a picture reconstruction procedure (S420 to S440) and an in-loop filtering procedure for a reconstructed picture (S450), as described above with reference to FIG. 3. The picture reconstruction procedure may be performed based on prediction samples and residual samples obtained through inter/intra prediction (S420) and residual processing (S430) (dequantization and inverse transform of the quantized transform coefficient) described in the present disclosure. A modified reconstructed picture may be generated through the in-loop filtering procedure for the reconstructed picture generated through the picture reconstruction procedure, the modified reconstructed picture may be output as a decoded picture, stored in a decoded picture buffer or memory 250 of the decoding apparatus and used as a reference picture in the inter prediction procedure when decoding the picture later.

In some cases, the in-loop filtering procedure may be omitted. In this case, the reconstructed picture may be output as a decoded picture, stored in a decoded picture buffer or memory 250 of the decoding apparatus, and used as a reference picture in the inter prediction procedure when decoding the picture later. The in-loop filtering procedure (S450) may include a deblocking filtering procedure, a sample adaptive offset (SAO) procedure, an adaptive loop filter (ALF) procedure and/or a bi-lateral filter procedure, as described above, some or all of which may be omitted. In addition, one or some of the deblocking filtering procedure, the sample adaptive offset (SAO) procedure, the adaptive loop filter (ALF) procedure and/or the bi-lateral filter procedure may be sequentially applied or all of them may be sequentially applied. For example, after the deblocking filtering procedure is applied to the reconstructed picture, the SAO procedure may be performed. Alternatively, for example, after the deblocking filtering procedure is applied to the reconstructed picture, the ALF procedure may be performed. This may be similarly performed even in the encoding apparatus.

Figure 5:
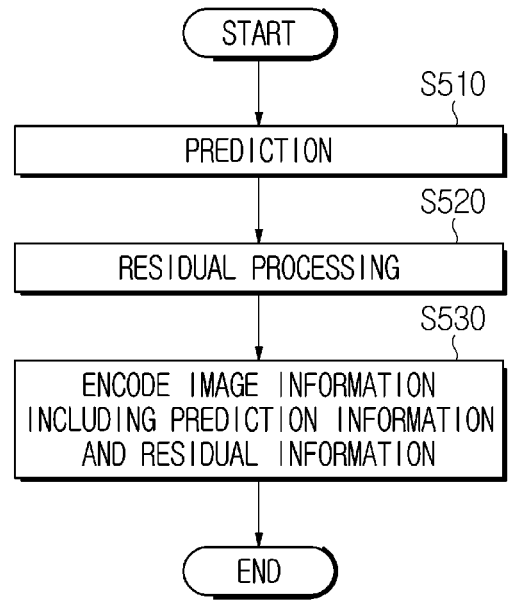
FIG. 5 is a flowchart schematically illustrating a picture encoding procedure, to which embodiments of the present disclosure are applicable.

FIG. 5 is a flowchart schematically illustrating a picture encoding procedure, to which embodiments of the present disclosure are applicable. In FIG. 5, S510 may be performed in the prediction unit including the intra prediction unit 185 or inter prediction unit 180 of the encoding apparatus described above with reference to FIG. 2, S520 may be performed in a residual processor including the transformer 120 and/or the quantizer 130, and S530 may be performed in the entropy encoder 190. S510 may include the inter/intra prediction procedure described in the present disclosure, S520 may include the residual processing procedure described in the present disclosure, and S530 may include the information encoding procedure described in the present disclosure.

Referring to FIG. 5, the picture encoding procedure may schematically include not only a procedure for encoding and outputting information for picture reconstruction (e.g., prediction information, residual information, partitioning information, etc.) in the form of a bitstream but also a procedure for generating a reconstructed picture for a current picture and a procedure (optional) for applying in-loop filtering to a reconstructed picture, as described with respect to FIG. 2. The encoding apparatus may derive (modified) residual samples from a quantized transform coefficient through the dequantizer 140 and the inverse transformer 150, and generate the reconstructed picture based on the prediction samples, which are output of S510, and the (modified) residual samples. The reconstructed picture generated in this way may be equal to the reconstructed picture generated in the decoding apparatus. The modified reconstructed picture may be generated through the in-loop filtering procedure for the reconstructed picture, may be stored in the decoded picture buffer or memory 170, and may be used as a reference picture in the inter prediction procedure when encoding the picture later, similarly to the decoding apparatus. As described above, in some cases, some or all of the in-loop filtering procedure may be omitted. When the in-loop filtering procedure is performed, (in-loop) filtering related information (parameter) may be encoded in the entropy encoder 190 and output in the form of a bitstream, and the decoding apparatus may perform the in-loop filtering procedure using the same method as the encoding apparatus based on the filtering related information.

Through such an in-loop filtering procedure, noise occurring during image/video coding, such as blocking artifact and ringing artifact, may be reduced and subjective/objective visual quality may be improved. In addition, by performing the in-loop filtering procedure in both the encoding apparatus and the decoding apparatus, the encoding apparatus and the decoding apparatus may derive the same prediction result, picture coding reliability may be increased and the amount of data to be transmitted for picture coding may be reduced.

As described above, the picture reconstruction procedure may be performed not only in the decoding apparatus but also in the encoding apparatus. A reconstructed block may be generated based on intra prediction/inter prediction in units of blocks, and a reconstructed picture including reconstructed blocks may be generated. When a current picture/slice/tile group is an I picture/slice/tile group, blocks included in the current picture/slice/tile group may be reconstructed based on only intra prediction. Meanwhile, when the current picture/slice/tile group is a P or B picture/slice/tile group, blocks included in the current picture/slice/tile group may be reconstructed based on intra prediction or inter prediction. In this case, inter prediction may be applied to some blocks in the current picture/slice/tile group and intra prediction may be applied to the remaining blocks. The color component of the picture may include a luma component and a chroma component and the methods and embodiments of the present disclosure are applicable to the luma component and the chroma component unless explicitly limited in the present disclosure.

Overview of Quantization/Dequantization

Hereinafter, quantization/dequantization according to the present disclosure will be described.

As described above, the quantizer of the encoding apparatus may derive quantized transform coefficients by applying quantization to transform coefficients, and the dequantizer of the encoding apparatus or the dequantizer of the decoding apparatus ma derive transform coefficients by applying dequantization to the quantized transform coefficients.

In general, in video/image coding, a quantization rate may be changed and a compression rate may be adjusted using the changed quantization rate. From an implementation point of view, in consideration of complexity, a quantization parameter (QP) may be used instead of directly using the quantization rate. For example, a quantization parameter having an integer value of 0 to 63 may be used and each quantization parameter value may correspond to an actual quantization rate. In addition, a quantization parameter $QP_Y$ for a luma component (luma sample) may be set to a value different from that of a quantization parameter $QP_C$ for a chroma component (chroma sample).

In a quantization process, a transform coefficient C may be received as input and divided by quantization rate Qstep, and a quantized transform coefficient C' may be obtained based on this. In this case, in consideration of computational complexity, the quantization rate is multiplied by a scale to form an integer and shift operation may be performed by a value corresponding to the scale value. Based on the product of the quantization rate and the scale value, a quantization scale may be derived. That is, the quantization scale may be derived according to QP. In this case, by applying the quantization scale to the transform coefficient C, the quantized transform coefficient C' may be derived.

A dequantization process is an inverse process of the quantization process, and the quantized transform coefficient C' may be multiplied by the quantization rate Qstep, thereby deriving a reconstructed transform coefficient C". In this case, a level scale may be derived according to the quantization parameter, the level scale may be applied to the quantization transform coefficient C', thereby deriving the reconstructed transform coefficient C". The reconstructed transform coefficient C" may be slightly different from the original transform coefficient C due to loss in the transform and/or quantization process. Accordingly, even the encoding apparatus may perform dequantization in the same manner as the decoding apparatus.

Meanwhile, adaptive frequency weighting quantization technology of adjusting a quantization strength according to frequency may apply. The adaptive frequency weighting quantization technology is a method of differently applying a quantization strength according to the frequency. In adaptive frequency weighting quantization, the quantization strength may differently apply according to the frequency using a predefined quantization scaling matrix. That is, the above-described quantization/dequantization process may be performed further based on the quantization scaling matrix. For example, a different quantization scaling matrix may be used according to a size of a current block and/or whether a prediction mode applying to the current block in order to generate a residual signal of the current block is inter prediction or intra prediction. The quantization scaling matrix may also be referred to as a quantization matrix or a scaling matrix. The quantization scaling matrix may be predefined. In addition, frequency quantization scale information for the quantization scaling matrix for frequency adaptive scaling may be constructed/encoded by the encoding apparatus and signaled to the decoding apparatus. The frequency quantization scale information may be referred to as quantization scaling information. The frequency quantization scale information may include scaling list data scaling_list_data. Based on the scaling list data, the (modified) quantization scaling matrix may be derived. In addition, the frequency quantization scale information may include present flag information specifying whether the scaling list data is present. Alternatively, when the scaling list data is signaled at a higher level (e.g., SPS), information specifying whether the scaling list data is modified at a lower level (e.g., PPS or tile group header, etc.) may be further included.

Example of Coding Layer and Structure

A coded video/image according to the present disclosure may be processed, for example, according to a coding layer and structure which will be described below.

Figure 6:
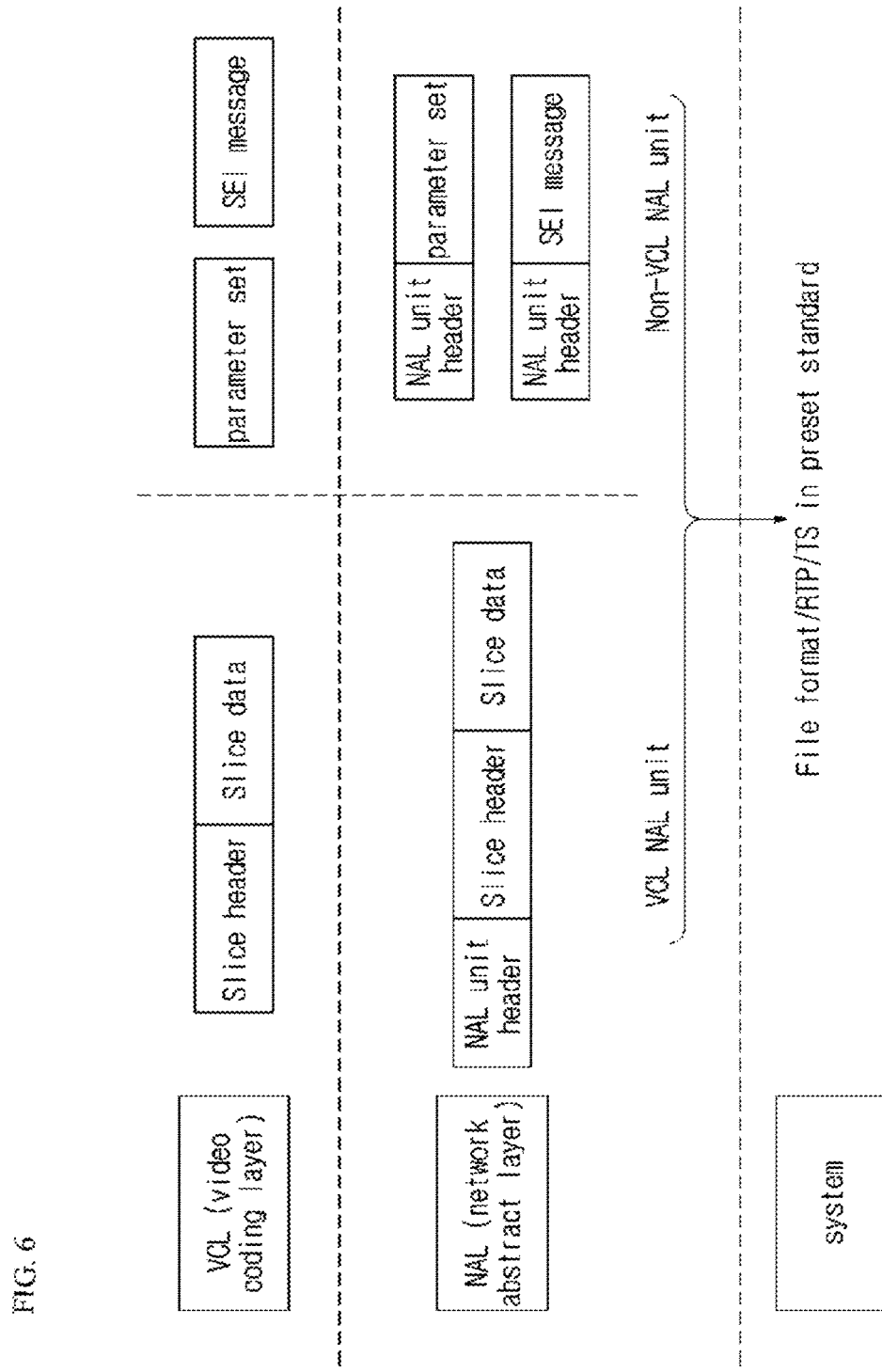
FIG. 6 is a view showing a hierarchical structure for a coded image.

FIG. 6 is a view showing a hierarchical structure for a coded image.

Referring to FIG. 6, the coded image may be classified into a video coding layer (VCL) for an image decoding process and handling itself, a low-level system for transmitting and storing encoded information, and a network abstraction layer (NAL) present between the VCL and the low-level system and responsible for a network adaptation function.

In the VCL, VCL data including compressed image data (slice data) may be generated or a supplemental enhancement information (SEI) message additionally required for a decoding process of an image or a parameter set including information such as a picture parameter set (PPS), a sequence parameter set (SPS) or a video parameter set (VPS) may be generated. In the above information/message, task information capable of being performed through an encoded image and additional information on an image, such as a method of generating an encoding target image, may be described as a syntax element according to a predetermined syntax table.

In the NAL, header information (NAL unit header) may be added to a raw byte sequence payload (RBSP) generated in the VCL to generate an NAL unit. In this case, the RBSP refers to slice data, a parameter set, an SEI message generated in the VCL. The NAL unit header may include NAL unit type information specified according to RBSP data included in a corresponding NAL unit.

As shown in the figure, the NAL unit may be classified into a VCL NAL unit and a non-VCL NAL unit according to the RBSP generated in the VCL. The VCL NAL unit may mean a NAL unit including information on an image (slice data), and the Non-VCL NAL unit may mean a NAL unit including information (parameter set or SEI message) required to decode an image. According to an embodiment, information indicating that the encoded image is image information for performing a specific task may be included in the VCL NAL unit. Alternatively, information indicating that the encoded image is image information for performing a specific task may be included in the non-VCL NAL unit.

The VCL NAL unit and the Non-VCL NAL unit may be attached with header information and transmitted through a network according to the data standard of the low-level system. For example, the NAL unit may be modified into a data format of a predetermined standard, such as H.266/VVC file format, RTP (Real-time Transport Protocol) or TS (Transport Stream), and transmitted through various networks.

As described above, in the NAL unit, a NAL unit type may be specified according to the RBSP data structure included in the corresponding NAL unit, and information on the NAL unit type may be stored in a NAL unit header and signalled.

For example, this may be largely classified into a VCL NAL unit type and a non-VCL NAL unit type depending on whether the NAL unit includes information on an image (slice data). The VCL NAL unit type may be classified according to the property and type of the picture included in the VCL NAL unit, and the Non-VCL NAL unit type may be classified according to the type of a parameter set.

An example of the NAL unit type specified according to the type of the parameter set/information included in the Non-VCL NAL unit type will be listed below.

DPS (Decoding Parameter Set) NAL unit: Type for NAL unit including DPS

VPS (Video Parameter Set) NAL unit: Type for NAL unit including VPS

SPS (Sequence Parameter Set) NAL unit: Type for NAL unit including SPS

PPS (Picture Parameter Set) NAL unit: Type for NAL unit including PPS

APS (Adaptation Parameter Set) NAL unit: Type for NAL unit including APS

PH (Picture header) NAL unit: Type for NAL unit including PH

The above-described NAL unit types may have syntax information for a NAL unit type, and the syntax information may be stored in a NAL unit header and signalled. For example, the syntax information may be nal_unit_type, and the NAL unit types may be specified as nal_unit_type values.

Meanwhile, as described above, one picture may include a plurality of slices, and one slice may include a slice header and slice data. In this case, one picture header may be further added to a plurality of slices (a slice header and a slice data set) in one picture. The picture header (picture header syntax) may include information/parameters commonly applicable to the picture.

The slice header (slice header syntax) may include information/parameters commonly applicable to the slice. The APS (APS syntax) or PPS (PPS syntax) may include information/parameters commonly applicable to one or more slices or pictures. The SPS (SPS syntax) may include information/parameters commonly applicable to one or more sequences. The VPS (VPS syntax) may include information/parameters commonly applicable to multiple layers. The DCI (DCI syntax) may include information/parameters commonly applicable to overall video. The DCI may include information/parameters related to decoding capability. In the present disclosure, high level syntax (HLS) may include at least one of the APS syntax, the PPS syntax, the SPS syntax, the VPS syntax, the DCI syntax, the picture header syntax or the slice header syntax. Meanwhile, in the present disclosure, low level syntax (LLS) may include, for example, slice data syntax, CTU syntax, coding unit syntax, transform unit syntax, etc.

In the present disclosure, image/video information encoded in the encoding apparatus and signalled to the decoding apparatus in the form of a bitstream may include not only in-picture partitioning related information, intra/inter prediction information, residual information, in-loop filtering information but also information on the slice header, information on the APS, information on the PPS, information on the SPS, information on the VPS and/or information on the DCI. In addition, the image/video information may further include general constraint information and/or information on a NAL unit header.

Overview of VCM

VCM (Video/image coding for machines) means encoding/decoding a part of a video source and/or information obtained from the video source according to a request of a user and/or a machine, a task purpose, and a surrounding environment. Here, the machine is a device that performs a predetermined task using a part of a video source and/or information obtained from the video source, and may mean a generic concept including an electronic device, a mechanical device, and/or a hybrid device.

VCM may be used to perform tasks for various purposes. For example, in a surveillance system that recognizes and tracks an object or a person, the VCM may be used to transmit or store information obtained from a surveillance camera. In addition, in a smart traffic system related to intelligent transportation, the VCM may be used to transmit vehicle location information collected from a GPS, sensing information collected from LIDAR, radar, etc. and various vehicle control information to other vehicles or infrastructure. Also, in the field of smart cities for monitoring traffic conditions and allocating resources, the VCM may be used to perform individual tasks of interconnected sensor nodes and devices.

In VCM, an encoding/decoding target may be referred to as a feature. Features may include a part of a video source and/or information extracted from the video source, and may be reconstructed to suit a particular task. Thus, a feature may have separate properties and constructional forms different from the video source. That is, the information form of the feature may be different from the information form of the video source, and the compression method and expression format of the feature may also be different from the compression method and expression format of the video source.

The present disclosure provides various embodiments related to a feature encoding/decoding method, and, unless otherwise specified, the embodiments of the present disclosure may be performed in combination of two or more. Hereinafter, embodiments of the present disclosure will be described in detail with reference to the accompanying drawings.

Figure 7:
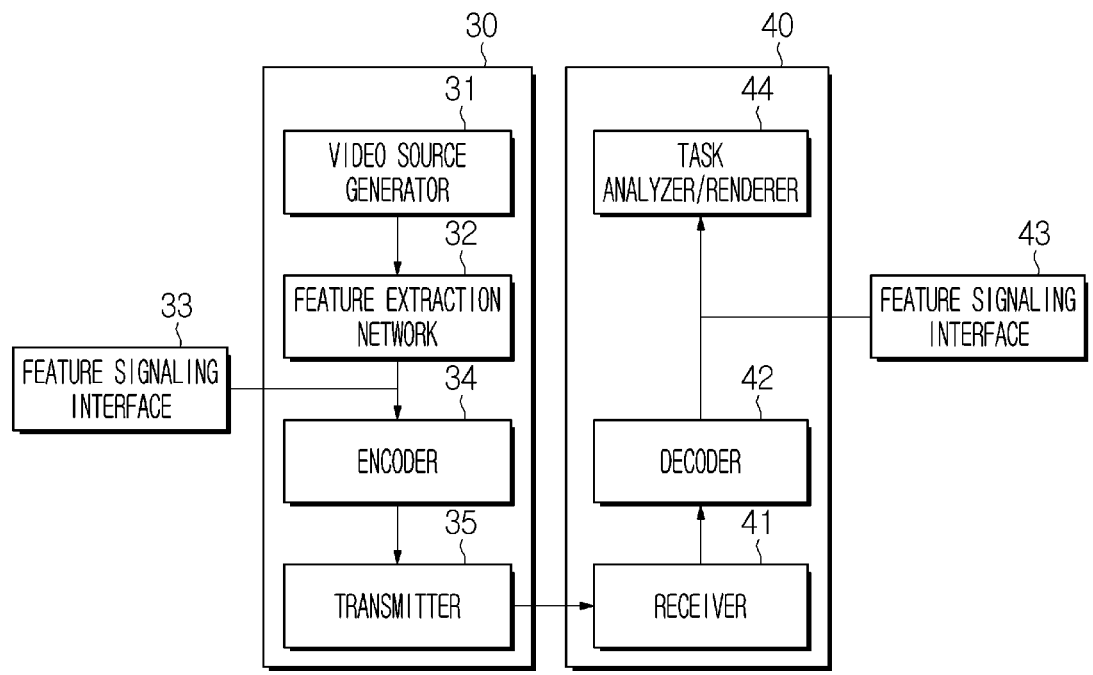
FIG. 7 is a view schematically illustrating a VCM system to which embodiments of the present disclosure are applicable.

FIG. 7 is a view schematically illustrating a VCM system to which embodiments of the present disclosure are applicable.

Referring to FIG. 7, the VCM system may include a source device 30 and a reception device 40. The source device 30 may transmit an encoded feature to the reception device 40 through a storage medium or a network. The source device 30 and the reception device 40 may be used by humans and/or machines, respectively.

The source device 30 may include a video source generator 31, a feature extraction network 32, a feature signaling interface 33, an encoder 34 and a transmitter 35.

The video source generator 31 may acquire a video/image through a process of capturing, synthesizing, or generating a video/image. The video source generator 31 may include a video/image capture device and/or a video/image generating device. The video/image synthesis and generation process may be performed during an information processing process by artificial intelligence (AI). In this case, the information generated through the video/image capture process may be used as input information of artificial intelligence (AI).

The feature extraction network 32 may extract a feature from the video/image obtained by the video source generator 31. The feature extraction network 32 may be implemented as an artificial neural network, for example, a convolutional neural network (CNN) or a deep neural network (DNN). In this case, the feature extraction network 32 may extract a feature by performing a neural network operation on the input video/image. The feature extraction network 32 may include at least one hardware, firmware and/or software module, and may be modeled using predetermined training data.

The feature extraction network 32 may transmit the feature extracted from the video/image to the encoder 34 through the feature signaling interface 33. In addition, the user may input various parameters related to the type of the feature, the acquisition method and/or the task to the feature extraction network 32 through the feature signaling interface 33.

Meanwhile, in FIG. 7, a case in which the feature extraction network 32 is included in the source device 30 is illustrated, but this is exemplary and thus embodiments of the present disclosure are not limited thereto. That is, the feature extraction network may be implemented as an external device separate from the source device 30, and in this case, the feature extraction network may communicate with the source device 30 through the feature signaling interface 33.

The encoder 34 may encode a feature extracted by the feature extraction network 32. The encoder 34 may perform a series of procedures such as prediction, transform, and quantization, in order to improve coding efficiency. Encoded data (e.g., feature information) may be output in the form of a bitstream.

The transmitter 35 may transmit the encoded feature information to the reception device 40 in the form of a file through a digital storage medium. The digital storage medium may include a variety of storage media such as USB, SD, CD, DVD, Blu-ray, HDD, and SSD. The transmitter 35 may include an element for generating a media file having a predetermined file format. Alternatively, the transmitter 35 may transmit the encoded feature information to the reception device 40 in the form of a streaming form through a network. The network may include a wired/wireless communication network such as the Internet, a local area network (LAN), and a wide LAN (WLAN). The transmitter 35 may include an element for transmitting the encoded feature information through a broadcast/communication network.

The reception device 40 may include a receiver 41, a decoder 42, a feature signaling interface 43 and a task analyzer/renderer 44.

The receiver 41 may receive a bitstream from the source device 30, extract a feature from the received bitstream, and transmit it to the decoder 42.

The decoder 42 may decode the feature received/extracted by the receiver 41. The decoder 42 may perform a series of procedures such as dequantization, inverse transformation, and prediction corresponding to the operation of the encoder 34, in order to improve decoding efficiency.

The decoder 42 may transmit the decoded feature to the task analyzer/renderer 44 through the feature signaling interface 43. In addition, a user may input various parameters related to the type of feature, the acquisition method, and/or the task to the task analyzer/renderer 44 through the feature signaling interface 43.

The task analyzer/renderer 44 may perform a task analysis and rendering process using the decoded feature, thereby performing a predetermined task (e.g., computer vision tasks such as face recognition, behavior recognition, lane recognition, etc.)

In this way, the VCM system may encode/decode the feature extracted from the video/image according to the request of the user and/or the machine, the task purpose, and the surrounding environment, and perform various machine-oriented tasks using the feature. In an example, the VCM system may be implemented by extending/redesigning the video/image coding system described above with reference to FIG. 1, and may perform various encoding/decoding methods defined in the VCM (Video Coding for Machines) standard.

Hereinafter, a feature extraction method and feature properties will be described in detail.

Figure 8:
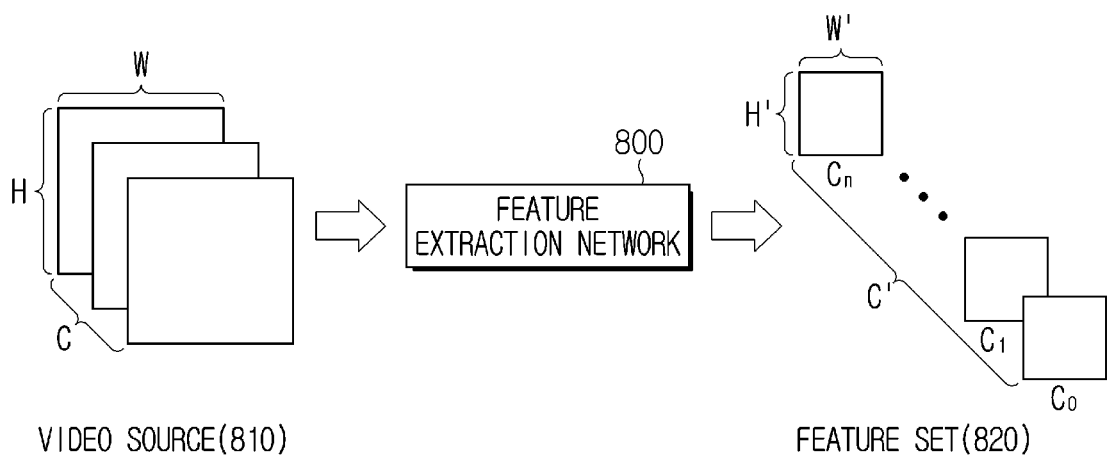
FIG. 8 is a view illustrating an example of a feature extraction method using a feature extraction network.

FIG. 8 is a view illustrating an example of a feature extraction method using a feature extraction network.

Referring to FIG. 8, a feature extraction network 800 may output a feature set 820 of a video source 810 by receiving the video source 810 and performing a feature extraction operation. The feature set 820 may include a plurality of features $C_0, C_1, \ldots, C_n$ extracted from the video source 810 and may be expressed as a feature map. Each of the features $C_0, C_1, \ldots, C_n$ may include a plurality of feature elements and may have different data distribution characteristics.

In FIG. 8, W, H, and C may mean the width, height, and number of channels of the video source 810, respectively. Here, the number C of channels of the video source 810 may be determined based on the color format of the video source 810. For example, when the video source 810 has an RGB color format, the number C of channels of the video source 810 may be three.

In addition, W', H', and C' may mean the width, height, and number of channels of the feature set 820, respectively. The number C' of channels of the feature set 820 may be equal to the total number (n+1) of the features $C_0, C_1, \ldots, C_n$ extracted from the video source 810. Also, in one example, the number C' of channels of the feature set 820 may be greater than the number C of channels of the video source 810. Each feature $C_0, C_1, \ldots, C_n$ extracted from the video source 810 may mean a channel, and, in the present disclosure, a feature and a channel will be used interchangeably unless otherwise noted.

The properties W', H' and C' of the feature set 820 may vary according to the properties W, H and C of the video source 810. For example, as the number C of channels of the video source 810 increases, the number C' of channels of the feature set 820 may also increase. Also, the properties W', H' and C' of the feature set 820 may vary depending on the type and property of the feature extraction network 800. For example, when the feature extraction network 800 is implemented as an artificial neural network (e.g., CNN, DNN, etc.), the properties W', H' and C' of the feature set 820 may also vary according to the properties (e.g., convolutional layer, a pooling layer, etc.) of the layer for outputting each feature $C_0, C_1, \ldots, C_n$.

Meanwhile, the video source 810 and the feature set 820 may have different data distribution characteristics. For example, the video source 810 may generally consist of one (Grayscale image) channel or three (RGB image) channels. Pixels included in the video source 810 may have the same integer value range for all channels, and may have non-negative values. In addition, each pixel value may be evenly distributed within the integer value range. On the other hand, the feature set 820 may be composed of various numbers (e.g., 32, 64, 128, 256, 512, etc.) of channels according to the type (e.g., CNN, DNN, etc.) of the feature extraction network 800 and layer properties. The feature elements included in the feature set 820 may have different real value ranges for each channel, and may have negative values. In addition, each feature element value may be intensively distributed in a specific region within the real value range.

Figure 9B:
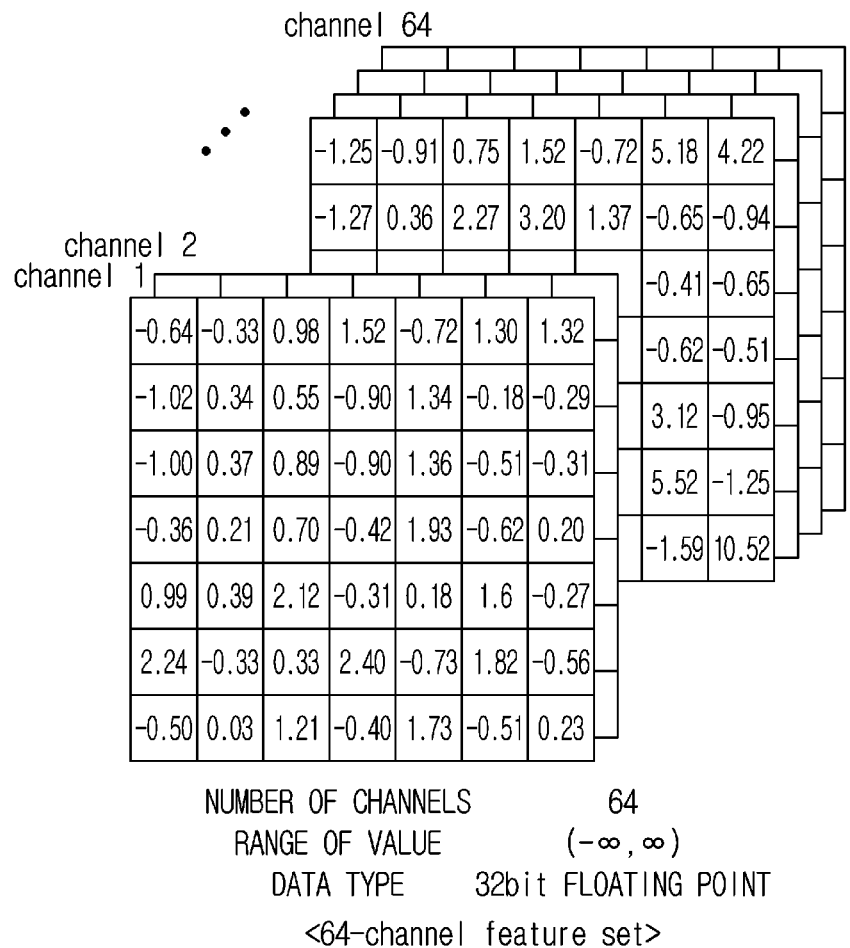
FIG. 9B is a view illustrating data distribution characteristics of a feature set.

FIG. 9A is a view illustrating data distribution characteristics of a video source, and FIG. 9B is a view illustrating data distribution characteristics of a feature set.

First, referring to FIG. 9A, a video source consists of a total of three channels R, G, and B, and each pixel value may have an integer value range from 0 to 255. In this case, the data type of the video source may be expressed as an 8-bit integer type.

On the other hand, referring to FIG. 9B, the feature set consists of 64 channels (features), and each feature element value may have a real value range from $-\infty$ to $+\infty$. In this case, the data type of the feature set may be expressed as a 32-bit floating-point type.

As such, a feature set may have properties and data distribution characteristics different from those of a video source. Therefore, the existing image/video compression technique cannot be applied to feature compression without change, and a new compression technique considering feature properties and data distribution characteristics is required. Accordingly, according to embodiments of the present disclosure, a feature quantization process for transforming a data type of a feature from a floating-point type to an integer type may be performed prior to a feature encoding process.

FIG. 10 is a view illustrating a VCM system for performing feature quantization/dequantization according to an embodiment of the present disclosure.

Referring to FIG. 10, a VCM system 1000 may include a feature extraction network 1010, a feature encoding apparatus 1020, a feature decoding apparatus 1030 and a task network 1040.

The feature extraction network 1010 may extract a feature set including one or more features from an input video/image. The feature extraction network 1010 may be implemented as an artificial neural network, for example, a convolutional neural network (CNN) or a deep neural network (DNN). In this case, the feature extraction network 1010 may extract a feature set by performing a neural network operation on the input video/image.

The feature set may have floating-point type feature element values, and may have different data distribution characteristics for each channel (or feature). Table 1 shows an example of data distribution characteristics for each channel of the feature set.

TABLE 1

| Channel | Average ($\mu$) | Standard derivation ($\sigma$) | Max | Min |
|---|---|---|---|---|
| $C_0$ | 10 | 20 | 90 | 60 |
| $C_1$ | 30 | 10 | 70.5 | −70.2 |
| ... | | | | |
| $C_n$ | 100 | 5 | 115.8 | 80.2 |

Referring to Table 1, the feature set may consist of a total of n+1 channels $C_0, C_1, \ldots, C_n$. The average value $\mu$, the standard deviation $\sigma$, the maximum value Max, and the minimum value Min of the feature elements may be different for each channel $C_0, C_1, \ldots, C_n$. For example, the average value $\mu$ of the feature elements included in Channel 0 ($C_0$) may be 10, the standard deviation $\sigma$ may be 20, the maximum value Max may be 90, and the minimum value Min may be 60. Also, the average value $\mu$ of the feature elements included in Channel 1 ($C_1$) may be 30, the standard deviation $\sigma$ may be 10, the maximum value Max may be 70.5, and the minimum value Min may be −70.2. Also, the average value $\mu$ of the feature elements included in Channel n ($C_n$) may be 100, the standard deviation $\sigma$ may be 5, the maximum value Max may be 115.8, and the minimum value Min may be 80.2.

As described above, in order to encode a feature set having different data distribution characteristics for each channel, it is necessary to adjust feature element values within a predetermined range.

To this end, the feature encoding apparatus 1320 may include a feature quantizer 1021 and an encoder 1023. The feature quantizer 1021 may quantize each feature in the feature set to transform the data type of each feature from a floating-point type to an integer type. The encoder 1023 may encode each quantized feature using a video/image coding technique such as prediction, transform, quantization, or the like. Also, the encoder 1023 may encode feature quantization-related information necessary to dequantize the quantized feature. Here, the feature quantization-related information may include various parameters used in the feature quantization process, for example, the maximum value, the minimum value, and the number of quantization bits of the feature elements. In addition, the encoded feature and feature quantization-related information may be transmitted to the feature decoding apparatus 1030 in the form of a bitstream.

The feature decoding apparatus 1030 may include a decoder 1031 and a feature dequantizer 1033. The decoder 1031 may decode each feature in the feature set and feature quantization-related information. The decoder 1031 may perform a series of procedures such as dequantization, inverse transform, and prediction corresponding to the operation of the encoder 1023 in order to improve decoding efficiency. In addition, the feature dequantizer 1033 may reconstruct the feature set by dequantizing each decoded feature based on the feature quantization-related information.

The task network 1040 may perform a predetermined task using the restored feature set. Here, the task may include various machine-oriented tasks, such as a computer vision task. The task network 1040 may analyze the task and render the reconstructed feature to perform a predetermined task.

As such, one or more features extracted from a video/image may be compressed/encoded through a feature quantization process and an encoding process. In addition, one or more compressed/encoded features may be reconstructed through a decoding process and a feature dequantization process.

According to some embodiments of the present disclosure, the feature quantization/dequantization process may be performed in units of feature sets or channels. Also, the feature quantization/dequantization process may be adaptively performed based on the type of activation function used to extract the feature set. Hereinafter, the above embodiments will be described in detail.

Embodiment 1

FIG. 11 is a view exemplarily illustrating a range of feature element values for each channel constituting a feature set, and FIG. 12 is a view exemplarily illustrating a data distribution range of a feature set according to the type of an activation function.

First, referring to FIG. 11, each channel (or feature) in a feature set may have a separate data distribution. For example, Channel 1 has a real value range greater than −1 and less than 3, Channel 2 has a real value range greater than 0 and less than 2, and Channel N has a real value range greater than −2 and less than 2. As a result, a channel having a wide data distribution range (e.g., Channel 5) and a channel having a narrow data distribution range (e.g., Channel 2) may coexist in the feature set.

However, when feature quantization is performed in consideration of all data distribution characteristics of each channel, a problem in which compression/encoding efficiency is lowered may occur. For example, when feature quantization is performed based on the maximum and minimum values of the feature elements of each channel, the amount of bits of feature quantization-related information may increase.

Accordingly, according to Embodiment 1 of the present disclosure, feature quantization/dequantization may be performed in units of feature sets (or feature maps). Specifically, a single feature quantization/dequantization operation for all channels in the feature set may be performed based on the maximum and minimum values of the feature elements included in the feature set. An example of the feature quantization operation is shown in Equation 1, and an example of the feature dequantization operation is shown in Equation 2.

$$\tilde{F} = \text{round}\left(\frac{F - \min(F)}{\max(F) - \min(F)} \cdot (2^b - 1)\right) \quad \text{[Equation 1]}$$

$$\hat{F} = \left(\frac{\tilde{F}(\max(F) - \min(F))}{2^b - 1} + \min(F)\right) \quad \text{[Equation 2]}$$

In Equations 1 and 2, F means the whole feature map of the feature set $\text{Fset}^{R \times C \times N}$, and b means the number of quantization bits. Here, R is the width of the feature set, C is the height of the feature set, and N is the number of channels in the feature set. In addition, max(F) means the maximum value of the feature elements in the whole feature map F, and min(F) means the minimum value of the feature elements in the whole feature map F.

Referring to Equations 1 and 2, a single quantization/dequantization operation may be performed on the whole feature map F. In this case, an example of feature quantization-related information for feature dequantization is shown in Table 2.

TABLE 2

| Quantization-related information | Description |
|---|---|
| Minimum value of whole feature | Minimum value of whole feature map given as input value of encoder apparatus |
| Maximum value of whole feature | Maximum value of whole feature map given as input value of encoder apparatus |
| Activation function information | Distinguish between activation function that needs to transmit minimum/maximum value and function that needs to transmit only the maximum value |
| Number of quantization bit | Number of bits used for quantization |

Referring to Table 2, quantization-related information may include the maximum value and minimum value of the feature elements in the feature set (or the feature map) and the number of quantization bits.

Meanwhile, the range of the feature element value may vary depending on the type of activation function used to extract the feature, as shown in FIG. 12.

Referring to FIG. 12, when a Rectified Linear Unit (ReLU) is used as the activation function ((a) of FIG. 12), the feature element value may have a real value range from 0 to +∞. Alternatively, when Leaky ReLU is used as the activation function ((b) of FIG. 12), the feature element value may have a real value range from −∞ to +∞. When there is a lower limit value of the feature elements, the lower limit value may be estimated as a minimum value of the feature elements.

In consideration of such a feature, according to Embodiment 1 of the present disclosure, the activation function may be classified into a first activation function that shall signal both the maximum and minimum values of the feature elements, and a second activation function that only needs to signal the maximum value of the feature elements. In addition, the feature quantization-related information may further include activation function information specifying the type of activation function according to the classification criterion. In an example, the activation function information may be expressed as 1-bit flag information. In this case, activation function information having a first value (e.g., 0) may specify that an activation function applied to a current feature is a first activation function. Alternatively, activation function information having a second value (e.g., 1) may specify that the activation function applied to the current feature is a second activation function.

An example of feature_set_header syntax including the above-described feature quantization-related information is shown in FIG. 13.

Referring to FIG. 13, feature_set_header syntax may include activation_function_type, quant_bit, min_value and max_value as feature quantization-related information.

A syntax element activation_function_type may specify the type of activation function applied to a current feature as activation function information. For example, activation_function_type may specify whether the activation function applied to the current feature is a first activation function that shall signal both the maximum and minimum values of the feature elements or a second activation function that only needs to signal the maximum value of the feature elements.

A syntax element quant_bit may indicate the number of quantization bits. That is, quant_bit may specify the number of bits required to transform the floating-point type of the feature element values into the integer type.

A syntax element min_value may specify the minimum value of the feature elements in the feature set. min_value may be signaled based on the value of activation_function_type. For example, when activation_function_type specifies a first activation function (e.g., Leaky ReLU), min_ value may be signaled only once for all channels. On the other hand, when activation_function_type specifies a second activation function (e.g., ReLU), min_value is not signaled and may be inferred to be a predetermined value, for example, a lower limit value (e.g., 0) of the second activation function.

A syntax element max_value may specify the maximum value of the feature elements in the feature set. Unlike min_value, max_value may be signaled regardless of the type of activation function applied to the current feature.

As described above, according to Embodiment 1 of the present disclosure, feature quantization/dequantization may be performed in units of feature sets. In addition, feature quantization-related information may be adaptively signaled based on the type of activation function. Accordingly, quantization performance and encoding/signaling efficiency may be further improved.

Embodiment 2

According to Embodiment 2 of the present disclosure, feature quantization/dequantization may be performed in units of channels (or features). Specifically, an individual feature quantization/dequantization operation for each channel may be performed based on the maximum and minimum values of the feature elements of each channel in the feature set. An example of the feature quantization operation is shown in Equation 3, and an example of the feature dequantization operation is shown in Equation 4.

$$\tilde{F}_n = \text{round}\left(\frac{F_n - \min(F_n)}{\max(F_n) - \min(F_n)} \cdot (2^b - 1)\right)$$ [Equation 3]

$$\hat{F}_n = \left(\frac{\tilde{F}_n(\max(F_n) - \min(F_n))}{2^b - 1} + \min(F_n)\right)$$ [Equation 4]

In Equation 3 and Equation 4, Fn denotes the n-th channel (n is an integer greater than or equal to 1) of the feature set $\text{Fset}^{R \times C \times N}$, and b denotes the number of quantization bits. Here, R is the width of the feature set, C is the height of the feature set, and N is the number of channels in the feature set. In addition, max(Fn) means the maximum value of the feature elements in the n-th channel Fn, and min(Fn) means the minimum value of the feature elements in the n-th channel Fn.

Referring to Equation 3 and Equation 4, an individual quantization/dequantization operation may be performed on each channel Fn in the feature set. In this case, an example of feature quantization-related information for feature dequantization is shown in Table 3.

TABLE 3

| quantization-related information | Description |
|---|---|
| Global quantization | Indicates whether the same quantization bit is used for the whole feature map |
| Minimum value of each channel | Minimum value of each channel of feature map |
| Maximum value of each channel | Maximum value of each channel of feature map |
| Activation function information | Distinguish between activation function that needs to transmit minimum/maximum value and function that needs to transmit only the maximum value |
| Number of quantization bits | One bit is transmitted when the same number of bits is used or The number of bits of each channel is transmitted when different number of quantization bits is used in each channel |

Referring to Table 3, quantization-related information may include maximum and minimum values of feature elements of each channel in a feature set, the number of quantization bits, and activation function information.

The activation function information may specify whether the activation function applied to the current feature is a first activation function (e.g., Leaky ReLU) that shall signal both the maximum and minimum values of the feature elements of each channel, or a second activation function (e.g., ReLU) that only needs to signal only the maximum value of the feature elements of each channel.

In addition, quantization-related information may further include global quantization information. The global quantization information may specify whether the number of quantization bits is individually set for each channel or equally set for all channels. When the number of quantization bits is equally set for all channels, the number of quantization bits may be signaled only once for all channels.

Figures 14, 15:
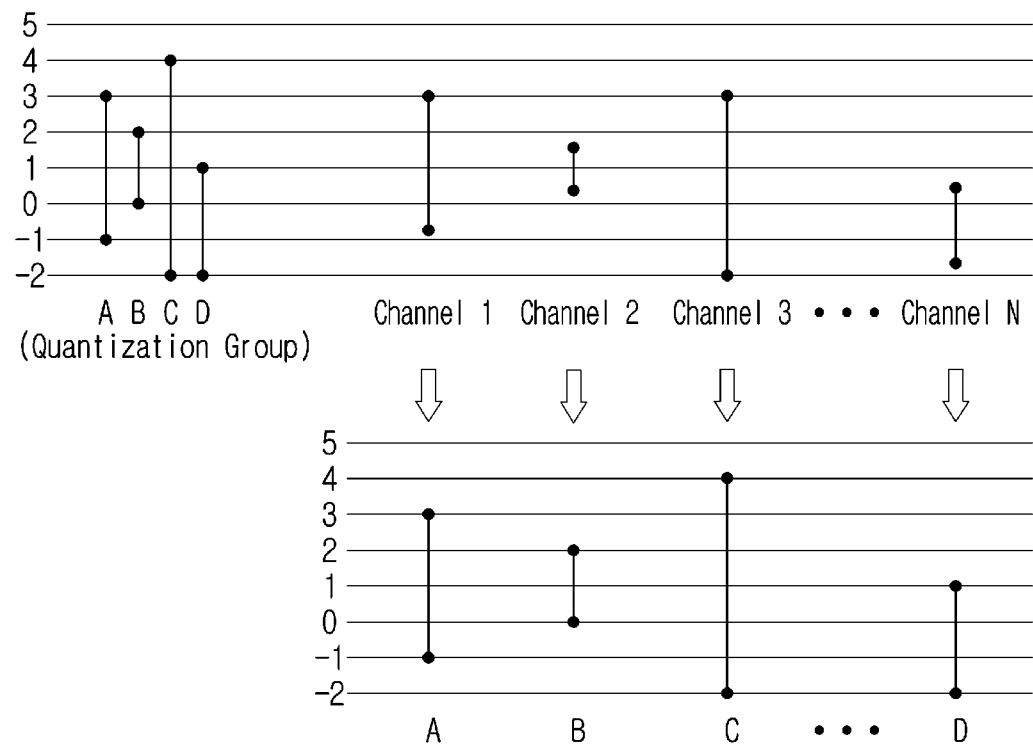
FIG. 14 is a view illustrating an example of a feature set header according to an embodiment of the present disclosure.
FIG. 15 is a view exemplarily illustrating a quantization group according to an embodiment of the present disclosure.

As described above, an example of feature_set_header syntax including the above-described feature quantization-related information is shown in FIG. 14.

Referring to FIG. 14, feature_set_header syntax may include global_quant, activation_function_type, quant_bit, quant_bit[i], min_value[i] and max_value[i] as feature quantization-related information.

The syntax element global_quant may specify whether the number of quantization bits is set for each channel or is equally set for all channels, as global quantization information. For example, when global_quant is true (or 1), the number of quantization bits may be equally set for all channels. On the other hand, when global_quant is false (or 0), the number of quantization bits may be set for each channel.

A syntax element activation_function_type is activation function information, and may specify the type of activation function applied to the current feature. For example, activation_function_type may indicate whether the activation function applied to the current feature is a first activation function that shall signal both the maximum and minimum values of the feature elements or a second activation function that only needs to signal the maximum value of the feature elements.

A syntax element quant_bit may specify the number of quantization bits equally set for all channels. When the above-described global_quant is true (or 1), the quant_bit may be signaled only once for all channels. Alternatively, when global_quant is false (or 0), quant_bit[i] specifying the number of quantization bits set in the i-th channel may be signaled.

A syntax element min_value[i] may specify the minimum value of the feature elements in the i-th channel. min_value[i] may be signaled based on the value of activation_function_type. For example, when activation_function_type specifies the first activation function (e.g., Leaky ReLU), min_value[i] may be signaled as many times as the number of channels (e.g., num_channels). On the other hand, when activation_function_type specifies the second activation function (e.g., ReLU), min_value[i] may be inferred to be a predetermined value (e.g., 0) without being signaled.

A syntax element max_value[i] may specify the maximum value of the feature elements in the i-th channel. max_value[i] may be signaled regardless of the type of activation function applied to the current feature, unlike min_value[i].

As described above, according to Embodiment 2 of the present disclosure, feature quantization/dequantization may be performed in units of channels (or features). In addition, feature quantization-related information may be adaptively signaled based on whether global quantization is performed and the type of activation function. Accordingly, quantization performance and encoding/signaling efficiency may be further improved.

Embodiment 3

According to Embodiment 3 of the present disclosure, feature quantization/dequantization may be performed based on a predetermined quantization group. Specifically, a plurality of quantization intervals may be set based on the data distribution characteristics of the feature set. The quantization intervals have different data distribution ranges and may be defined as one quantization group. In addition, by transforming the data distribution of each channel in the feature set into a data distribution range of any one of the quantization intervals, a feature quantization/dequantization operation may be performed.

FIG. 15 is a view exemplarily illustrating a quantization group according to an embodiment of the present disclosure.

Referring to FIG. 15, a quantization group may include four quantization intervals A, B, C, and D having different data distribution ranges. Each of the quantization intervals A, B, C, and D in the quantization group is defined using a minimum value and a maximum value, and may be set based on the data distribution characteristics of the current feature. For example, the quantization interval A may be set to [−1, 3], the quantization interval B may be set to [0, 2], the quantization interval C may be set to [−2, 4], and the quantization interval D may be set to [−2, 1].

The feature encoding apparatus may quantize each channel (or feature) in the feature set based on preset quantization intervals (A, B, C, D) without separately calculating the maximum and minimum values of the feature elements. For example, Channel 1 may be quantized based on a quantization interval A having the most similar data distribution range. Also, Channel 2 may be quantized based on the quantization interval B having the most similar data distribution range. Also, Channel 3 may be quantized based on the quantization interval C having the most similar data distribution range. Also, Channel 4 may be quantized based on the quantization interval D having the most similar data distribution range. In this case, the feature encoding apparatus may encode/signal the number of quantization intervals, the minimum value, and the maximum value as feature quantization-related information. Also, the feature encoding apparatus may signal quantization interval index information specifying a quantization interval used to encode a current channel (or feature) as feature quantization-related information. Accordingly, since it is not necessary to signal the number of quantization bits of each channel and the maximum and minimum values of the feature elements, the amount of transmitted bits may be reduced, and encoding/signaling efficiency may be further improved.

The feature decoding apparatus may configure the same quantization group as the quantization group configured in the feature encoding apparatus based on the number of quantization intervals received from the feature encoding apparatus, and the minimum and maximum values for each interval. Alternatively, the feature decoding apparatus may configure a quantization group based on data distribution characteristics of the reconstructed feature sets. In addition, the feature decoding apparatus may dequantize the current feature based on the quantization interval identified by the quantization interval index information received from the feature encoding apparatus.

An example of a feature quantization operation based on a quantization group is shown in Equation 5 and Equation 6.

$$F_{norm} = \frac{F_n - \min(F_n)}{\max(F_n) - \min(F_n)} \quad \text{[Equation 5]}$$

In Equation 5, Fn denotes the n-th channel (n is an integer greater than or equal to 1) of the feature set $Fset^{R \times C}$. Here, R is the width of the feature set, and C is the height of the feature set. In addition, max(Fn) means the maximum value of the feature elements in the n-th channel Fn, and min(Fn) means the minimum value of the feature elements in the n-th channel Fn.

Referring to Equation 5, the n-th channel Fn may be normalized to have feature element values between 0 and 1 based on the maximum and minimum values of the feature elements in the channel.

$$F_n{}^G = F_n{}^{norm} \cdot (\max(F_{G_m}) - \min(F_{G_m})) + \min(F_{G_m}) \quad \text{[Equation 6]}$$

In Equation 6, $Fn^{norm}$ means the normalized n-th channel of the feature set $Fset^{R \times C}$. Here, R is the width of the feature set, and C is the height of the feature set. In addition, max(FGm) means the maximum value of the quantization interval $F_{G_m}$ applied to the n-th channel Fn, and min($F_{G_m}$) means the minimum value of the quantization interval $F_{G_m}$ applied to the n-th channel Fn.

Referring to Equation 6, the normalized n-th channel $Fn^{norm}$ may be quantized based on the maximum value max($F_{G_m}$) and the minimum value min($F_{G_m}$) of the quantization interval $F_{G_m}$ applied to the n-th channel Fn. In this case, an example of feature quantization-related information for feature dequantization is shown in Table 4.

TABLE 4

| quantization-related information | Description |
|---|---|
| Global quantization | Indicates the same quantization bit is used for global feature map |
| Activation function information | Distinguish between activation function that needs to transmit minimum/maximum value and function that needs to transmit only the maximum value |
| Number of Quantization Group | Number of quantization intervals in quantization group |
| Maximum value of Quantization Group | Minimum value of each quantization interval in quantization group |

TABLE 4-continued

| quantization-related information | Description |
|---|---|
| Maximum value of each channel | Maximum value of each quantization interval in quantization group |
| Number of quantization bits | One bit is transmitted when the same number of bits is used or The number of bits of each channel is transmitted when different number of quantization bits is used in each channel |
| Group index of each channel | Information indicating which representative interval in quantization group each channel is transformed into |

Referring to Table 4, quantization-related information may include global quantization information, activation function information, the number of quantization bits, and quantization interval index information.

The global quantization information may specify whether the number of quantization bits is set for each quantization interval or is equally set for all quantization intervals.

The activation function information may specify the type of activation function applied to the current feature. In an example, the activation function information specifies whether the activation function applied to the current feature is a first activation function that shall signal both the maximum value and the minimum value of each quantization interval, or a second activation function that only needs to signal the maximum value of each quantization interval.

The number of quantization bits may be set for each quantization interval based on the above-described global quantization information, or may be equally set for all quantization intervals. When the number of quantization bits is equally set for all quantization intervals, the number of quantization bits may be signaled only once for all quantization intervals.

Also, the quantization-related information may further include the number of quantization intervals in a quantization group and minimum and maximum values of each quantization interval. In this case, the minimum and maximum values of each quantization interval may be adaptively signaled based on the type of the activation function. For example, when the activation function applied to the current feature is a first activation function (e.g., Leaky ReLU), both the minimum and the maximum values of each quantization interval may be signaled. On the other hand, when the activation function applied to the current feature is a second activation function (e.g., ReLU), the minimum value of each quantization interval is estimated to be 0, and only the maximum value of each quantization interval may be signaled.

As described above, an example of feature_set_header syntax including the above-described quantization-related information is shown in FIG. 16.

Referring to FIG. 16, feature_set_header syntax may include global_quant, activation_function_type, quant_bit, num_quant_group, quant_bit[i], min_value[i], max_value[i] and quant_group_jdx[i] as quantization-related information.

A syntax element global_quant may specify whether the number of quantization bits is set for each quantization interval or is equally set for all quantization intervals, as global quantization information. For example, when global_quant is true (or 1), the number of quantization bits may be equally set for all quantization intervals. On the other hand, when global_quant is false (or 0), the number of quantization bits may be set for each quantization interval.

A syntax element activation_function_type may specify the type of activation function applied to the current feature, as activation function information. For example, activation_function_type may specify whether the activation function applied to the current feature is a first activation function that shall signal both the minimum and maximum values of each quantization interval, or a second activation function that only needs to signal the maximum value of each quantization interval.

A syntax element quant_bit may specify the number of quantization bits equally set for all quantization intervals. When the above-described global_quant is true (or 1), quant_bit may be signaled only once for all quantization intervals. On the other hand, when global_quant is false (or 0), a syntax element quant_bit[i] specifying the number of quantization bits set in the i-th quantization interval may be signaled.

A syntax element num_quant_group may indicate the number of quantization intervals in a quantization group.

A syntax element min_value[i] may indicate the minimum value of the i-th quantization interval. min_value[i] may be signaled based on the value of activation_function_type. For example, when activation_function_type specifies a first activation function (e.g., Leaky ReLU), min_value[i] may be signaled. On the other hand, when activation_function_type specifies a second activation function (e.g., ReLU), min_value[i] may be inferred to be a predetermined value (e.g., 0) without being signaled.

A syntax element max_value[i] may specify the maximum value of the i-th quantization interval. max_value[i] may be signaled regardless of the type of activation function applied to the current feature, unlike min_value[i].

The feature decoding apparatus may configure the same quantization group as the quantization group configured in the feature encoding apparatus based on the above-described num_quant_group, min_value[i], and max_value[i].

A syntax element quant_group_idx[i] may specify an index value specifying a quantization interval applied to the i-th channel And, the feature decoding apparatus may dequantize the current feature based on the quantization interval specified by quant_group_idx[i].

As described above, according to Embodiment 3 of the present disclosure, feature quantization/dequantization may be performed based on a predetermined quantization group. In addition, the feature quantization information may be adaptively signaled based on whether global quantization is performed and the type of activation function. Accordingly, quantization performance and encoding/signaling efficiency may be further improved.

Meanwhile, as described above with reference to Table 1, the feature set may have floating-point type feature element values, and may have different data distribution characteristics for each channel (or feature). For example, the average value, standard deviation, maximum value, and minimum value of the feature elements may vary according to the channel. Accordingly, when feature quantization/dequantization is performed according to the same criteria (e.g., maximum and minimum values of feature elements and the number of quantization bits) for all channels in the feature set, a problem in which quantization performance is deteriorated may occur. Conversely, when feature quantization/dequantization is performed according to different criteria for all features in the feature set, the amount of bits of feature quantization-related information increases and compression efficiency may decrease.

Accordingly, according to some embodiments of the present disclosure, the feature quantization/dequantization process may be adaptively performed based on the importance of the feature set and/or channel. Also, the feature quantization/dequantization process may be adaptively performed based on spatiotemporal similarity between feature sets and/or channels. Hereinafter, the above embodiments will be described in detail.

Embodiment 4

According to Embodiment 4 of the present disclosure, feature quantization/dequantization may be performed based on the importance of a feature set and/or a channel. For example, for feature sets and/or channels with relatively high importance, the quantization interval may be narrowed to minimize information loss, and, for feature sets and/or channels with relatively low importance, the quantization interval may be widened to increase the amount of information to be encoded. To this end, an importance map (IM) representing the importance of the feature set and/or the channel may be defined. In the present disclosure, importance may mean a priority of data/information required to perform a predetermined machine-oriented task.

Figure 17A:
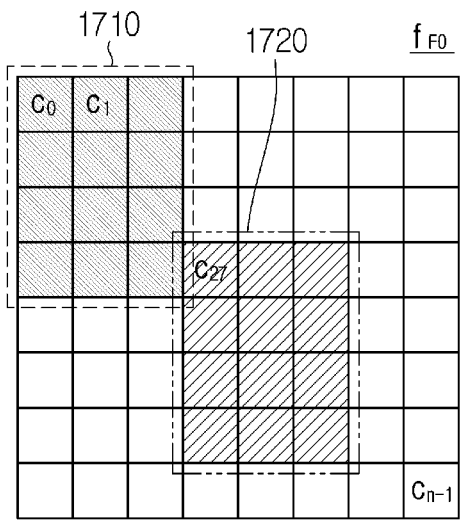
FIGS. 17A and 17B are views illustrating the importance of each feature set.
Figure 17B:
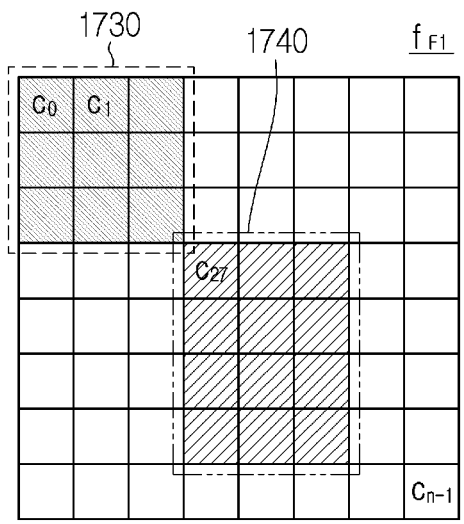

FIGS. 17A and 17B are views illustrating importance of each feature set. Specifically, FIG. 17A illustrates the importance of a first feature set fro extracted from a first frame F0 of a video source, and FIG. 17B illustrates the importance of a second feature set $f_{F1}$ extracted from a second frame F1 of a video source.

Referring to FIGS. 17A and 17B, each of the first feature set $f_{F0}$ and the second feature set $f_{F1}$ may include a plurality of channels (or features) $C_0, C_1, \ldots, C_{27}, \ldots C_{n-1}$. Each of the channels $C_0, C_1, \ldots, C_{27}, \ldots C_{n-1}$ may have different importance according to the task purpose and the surrounding environment. For example, in the first feature set fro, channels $C_0$, $C_1$, $C_{27}$ present in a first region 1710 and a second region 1720 corresponding to a region of interest (ROI) may have higher importance than channels present in the remaining region. Also, in the second feature set $f_{F1}$, channels $C_0$, $C_1$, $C_{27}$ present in a first region 1730 and a second region 1740 corresponding to a region of interest ROI may have higher importance than channels present in the remaining region. Based on such importance for each channel, an importance map (IM) may be defined by mapping a predetermined importance value to each channel in the feature sets $f_{F0}$ or $f_{F1}$.

In an example, the importance map may be expressed as shown in Table 5 using a 1-bit importance value for each channel.

TABLE 5

| Channel | Importance |
|---|---|
| $C_0$ | 1 |
| $C_1$ | 1 |
| ... | ... |
| $C_{n-1}$ | 0 |

Referring to Table 5, in each feature set $f_{F0}$ or $f_{F1}$, a binary value '1' may be mapped to channels having relatively high importance, and a binary value '0' may be mapped to channels having relatively low importance.

In addition, the importance map may be expressed as shown in Table 6 using a 2-bit importance value for each channel.

TABLE 6

| Channel | Importance |
|---|---|
| $C_0$ | 01 |
| ... | ... |
| $C_{27}$ | 10 |
| ... | ... |
| $C_{n-1}$ | 00 |

Referring to Table 6, in each feature set $f_{F0}$ or $f_{F1}$, a binary value '10' may be mapped to channels having relatively highest importance, a binary value '01' may be mapped to a channel having relatively high importance, and a binary value '00' may be mapped to channels having relatively low importance. As described above, by increasing the number of bits of the importance value, the importance of the feature sets $f_{F0}$ or $f_{F1}$ may be more subdivided and expressed.

In another example, the importance map may be expressed as shown in Table 7 using a coordinate value for each region and a 2-bit importance value. Table 7 shows the importance of the first feature set fFo of FIG. 20*a*.

TABLE 7

| Area | Importance |
|---|---|
| (0, 0), (3, 4) | 01 |
| (3, 3), (6, 7) | 10 |

Referring to Table 7, in the first feature set $f_{F0}$, a binary value '01' may be mapped to the first region 1710 having relatively high importance, and a binary value '10' may be mapped to the second region 1720 having relatively highest importance. In this case, the first region 1710 and the second region 1720 may be expressed using upper-left coordinates and lower-right coordinates of each region. For example, the first region 1710 may be expressed as '(0,0), (3,4)', and the second region 1720 may be expressed as '(3,3), (6,7)'. Alternatively, the first region 1710 and the second region 1720 may be expressed using a center point and a range (e.g., angle) of each region. The importance map described above with reference to Tables 5 to 7 may be signaled to the feature decoding apparatus as side information for feature dequantization.

Feature quantization/dequantization may be differentially performed based on the importance of the above-described feature set and/or channel. That is, a differential number of quantization bits according to importance of each feature set and/or channel may be applied. For example, in the first feature set $f_{F0}$, the second region 1720 having relatively highest importance may be quantized to 12 bits. Also, in the first feature set $f_{F0}$, the first region 1710 having relatively high importance may be quantized to 10 bits. In addition, in the first feature set $f_{F0}$, the remaining region having relatively low importance may be quantized to 8 bits.

As described above, according to Embodiment 4 of the present disclosure, feature quantization/dequantization may be performed based on the importance of a feature set and/or a channel. For example, a differential number of quantization bits according to respective importance may be applied to a feature set and/or a channel. Accordingly, quantization performance may be further improved.

Embodiment 5

As the importance of the feature set and/or the channel is more subdivided (that is, as the number of bits of the importance value increases), the quantization performance may be further improved. However, as a result, the amount of information in the importance map increases, which may cause a side effect of lowering encoding/signaling efficiency.

In order to solve this problem, according to Embodiment 5 of the present disclosure, the importance map may be encoded/signaled based on spatiotemporal similarity between feature sets and/or channels.

Specifically, temporal similarity may exist between consecutive frames in a video source. For example, in a video source having a frame rate of 30 Hz, a temporal interval between consecutive first and second frames is only 1/30 seconds. Accordingly, the temporal similarity between the first frame and the second frame may be high. Also, spatial similarity may be high between frames having high temporal similarity. Due to such a property of a video source, feature sets and/or channels continuously extracted from the video source may have similar importance to each other. Accordingly, according to Embodiment 5 of the present disclosure, the importance map may be encoded/signaled as a difference from a predetermined reference value. In an example, the reference value may be an importance map of a previous feature set preceding the current feature set in encoding order. In this case, the importance map of the current feature set may be encoded/signaled through an exclusive or (XOR) operation with the importance map of the previous feature set. A specific example thereof is shown in Equation 7.

$$\text{Importance map of } f_{F_0} = \{11100000 \ldots 0\} \quad \text{[Equation 7]}$$
$$\oplus$$
$$\text{Importance map of } f_{F_1} = \{11100000 \ldots 0\}$$
$$= \{000000 \ldots 0\}$$

In Equation 7, $f_{F_0}$ denotes a first feature set extracted from Frame 0 (F0), and $f_{F_1}$ denotes a second feature set extracted from Frame 1 (F1).

Referring to Equation 7, the importance map of the second feature set $f_{F_1}$ may be encoded/signaled through an XOR operation with the importance map of the first feature set $f_{F_0}$. Accordingly, the importance map of the second feature set $f_{F_1}$ includes more binary values '0' than the original importance map, so that the amount of information to be encoded may be reduced. On the other hand, when the first feature set $f_{F_0}$ is not present (e.g., when the second feature set $f_{F_1}$ is first quantized), the importance map of the second feature set $f_{F_1}$ may be encoded/signaled as the original value.

As described above, according to Embodiment 5 of the present disclosure, the importance map may be encoded/signaled based on spatiotemporal similarity between feature sets and/or channels. For example, the importance map of the current feature set may be encoded/signaled through XOR operation with the importance map of the previous feature set in encoding order. Through this, encoding/signaling efficiency may be further improved.

Embodiment 6

The above-described encoding/signaling method of the importance map may be equally/similarly applied to feature quantization-related information (e.g., the number of quantization bits, minimum and maximum values of feature elements).

Specifically, due to the spatiotemporal similarity between consecutive frames, feature sets and/or channels consecutively extracted from a video source may have the same/similar data distribution characteristics to each other. Table 8 shows the data distribution characteristics of feature sets consecutively extracted from a video source.

TABLE 8

| Feature set | Average (μ) | Standard derivation (σ) | Max | Min |
|---|---|---|---|---|
| $f_{F0}$ | 50 | 10 | 110.5 | 10.7 |
| $f_{F1}$ | 52 | 11 | 120.5 | 11.5 |
| $f_{Fn}$ | 53 | 10 | 115 | 5 |

In Table 8, $f_{F0}$ means a first feature set extracted from Frame 0 (F0), $f_{F1}$ means a second feature set extracted from frame 1 (F1), and $f_{F2}$ means a third feature set extracted from Frame 2 (F2).

Referring to Table 8, the consecutive first to third feature sets $f_{F0}$, $f_{F1}$ and $f_{F2}$ have the same/similar average value μ, standard deviation σ, maximum value Max and minimum value Min.

Also, due to the spatiotemporal similarity between consecutive frames, corresponding channels in feature sets consecutively extracted from a video source may have the same/similar data distribution characteristics to each other. Table 9 shows the data distribution characteristics of corresponding channels in feature sets consecutively extracted from a video source.

TABLE 9

| Feature set | Average (μ) | Standard derivation (σ) | Max | Min |
|---|---|---|---|---|
| $f_{F0C0}$ | 40 | 10 | 110.5 | 10.7 |
| $f_{F1C0}$ | 40 | 11 | 111.5 | 11.5 |

In Table 9, $f_{F0C0}$ means a first channel in a first feature set extracted from Frame 0 (F0), and $f_{F1C0}$ means a first channel in a second feature set extracted from Frame 1 (F1).

Referring to Table 9, the first channel $f_{F0C0}$ in the first feature set and the second channel $f_{F0C1}$ in the second feature set corresponding thereto have the same/similar average value (μ), standard deviation (σ), maximum value Max, and minimum value Min.

As described above, feature quantization-related information generated in a consecutive feature quantization process may have the same/similar value to each other. Accordingly, according to Embodiment 6 of the present disclosure, side information including an importance map and feature quantization-related information may be encoded/signaled based on spatiotemporal similarity between feature sets and/or channels.

In an embodiment, side information may be encoded/signaled in different units based on spatiotemporal similarity between feature sets and/or channels. For example, when the spatiotemporal similarity between feature sets and/or channels is relatively high, side information may be encoded/signaled in relatively large units. On the contrary, when the spatiotemporal similarity between feature sets and/or channels is relatively low, side information may be encoded/signaled in relatively small units. Meanwhile, the coding/signaling unit of side information may be determined by additionally considering the amount of information and coding efficiency. An example of an encoding/signaling unit of side information is shown in Table 10.

TABLE 10

| Coding unit | Description |
| --- | --- |
| Sequence level | Encodes IM and Q info in units of whole sequence |
| Group of feature set(GOF) level | Encode IM and Q info using a predetermined number of feature sets as one unit |
| Feature set level | Encode IM and Q info in units of feature sets |
| Feature(channel) level | Encode IM and Q info in units of features (channels) |

Referring to Table 10, side information may be encoded/signaled in units of sequences, groups of feature sets (GOFs), feature sets, or features.

Figure 18:
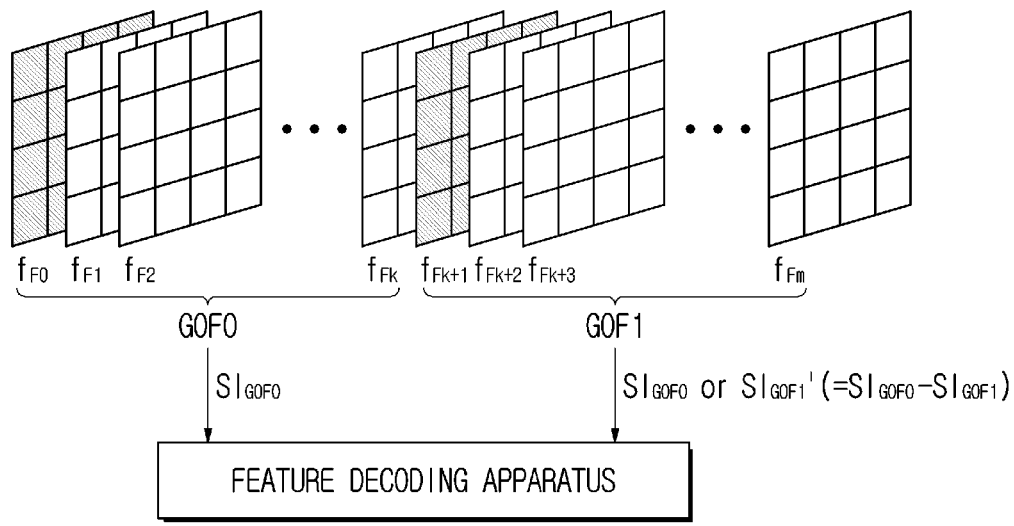
FIG. 18 is a view illustrating an example of encoding/signaling side information in GOF units.

FIG. 18 is a view illustrating an example of encoding/signaling side information in GOF units.

Referring to FIG. 18, a plurality of feature sets $f_{F0}$ to $f_{Fk}$ extracted from consecutive Frames 0 to k (F0 to Fk) may constitute a first GOF GOF0. Also, the plurality of feature sets $f_{Fk+1}$ to $f_{Fm}$ extracted from consecutive Frames k+1 to m (Fk+1 to Fm) may constitute a second GOF GOF1.

The first GOF GOF0 may be first quantized at the feature set group level. In addition, the first side information $SI_{GOF0}$ f the first GOF GOF0 may be encoded and signaled to the feature decoding apparatus. In this case, the first side information $SI_{GOF0}$ may be used as a reference value for encoding second side information $SI_{GOF1}$ of the subsequent second GOF GOF1.

The second GOF GOF1 may be secondly quantized at the feature set group level. In addition, second side information $SI_{GOF1}$ of the second GOF GOF1 may be encoded/signaled based on the data similarity between the first side information $SI_{GOF0}$ and the second side information $SI_{GOF1}$. For example, when the first side information $SI_{GOF0}$ and the second side information $SI_{GOF1}$ have dissimilar values to each other, the second side information $SI_{GOF1}$ may be independently encoded/coded regardless of the first side information $SI_{GOF0}$. On the other hand, when the first side information $SI_{GOF1}$ and the second side information $SI_{GOF1}$ have the same/similar values, the second side information SIGOF1 may be encoded/signaled as a difference $SI_{GOF1}'=SI_{GOF0}-SI_{GOF1}$ from the first side information $SI_{GOF0}$.

Figure 19:
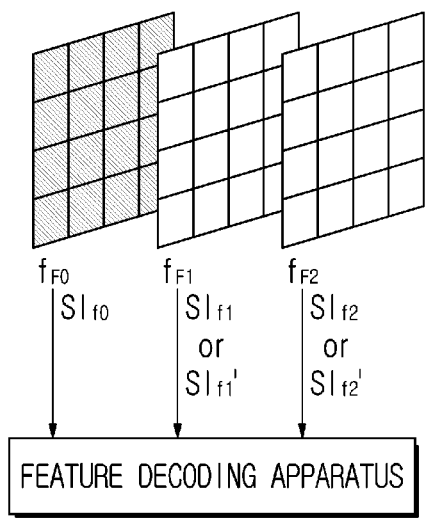
FIG. 19 is a view illustrating an example of encoding/signaling side information in feature set units.

FIG. 19 is a view illustrating an example of encoding/signaling side information in feature set units.

Referring to FIG. 19, a first feature set $f_{F0}$ extracted from Frame 0 (F0) may be first quantized at the feature set level. In addition, first side information $SI_{f0}$ of the first feature set fro may be encoded and signaled to the feature decoding apparatus. In this case, the first side information $SI_{f0}$ may be used as a reference value for encoding second side information $SI_{f1}$ of a subsequent second feature set $f_{F1}$.

The second feature set $f_{F1}$ extracted from Frame 1 (F1) may be secondly quantized at the feature set level. In addition, the second side information $SI_{f1}$ of the second feature set $f_{F1}$ may be encoded/signaled based on data similarity with the first side information $SI_{f0}$. For example, when the first side information $SI_{f0}$ and the second side information $SI_{f1}$ have dissimilar values, the second side information $SI_{f1}$ may be independently encoded/signaled regardless of the first side information $SI_{f0}$. On the other hand, when the first side information $SI_{f0}$ and the second side information $SI_{f1}$ have the same/similar values, the second side information $SI_{f1}$ may be encoded/signaled as a difference $SI_{f1}'=SI_{f0}-SI_{f1}$ from the first side information $SI_{f0}$.

A third feature set $f_{F2}$ extracted from Frame 2 (F2) may be thirdly quantized at the feature set level. In addition, third side information $SI_{f2}$ of the third feature set $f_{F2}$ may be encoded/signaled independently or as a difference $SI_{f2}'=SI_{f1}-SI_{f2}$ from the second side information $SI_{f1}$ based on data similarity with the second side information $SI_{f1}$.

As described above, according to Embodiment 6 of the present disclosure, side information including an importance map and feature quantization-related information may be encoded/signaled based on spatiotemporal similarity between feature sets and/or channels. For example, side information of a current feature set may be encoded/signaled as a difference from side information of a previous feature set in encoding order. Through this, encoding/signaling efficiency may be further improved.

An example of the feature encoding apparatus to which Embodiments 4 to 6 of the present disclosure are applicable is illustrated in FIG. 20.

FIG. 20 is a view illustrating a feature encoding apparatus according to an embodiment of the present disclosure.

Referring to FIG. 20, the feature encoding apparatus 2000 performs a feature quantization/encoding process with a feature set extracted from a video source as an input Sin based on an artificial neural network, thereby outputting the encoded feature set and side information (Sout). To this end, the feature encoding apparatus 2000 may include a feature quantizer 2010 and an encoder 2030.

The feature quantizer 2010 may adaptively quantize the feature set based on the importance of the feature set and/or the channel. The feature quantizer 2010 may include an importance determiner 2011 and an adaptive quantizer 2013.

The importance determiner 2011 may determine the importance of the feature set and/or the channel in consideration of the task purpose and the surrounding environment. The importance determiner 2011 may generate an importance map (IM) by mapping a predetermined importance value for each channel in the feature set based on the determined importance. In this case, as the number of bits of the importance value increases, the importance of the feature set may be expressed in more detail.

The adaptive quantizer 2013 may differentially quantize the feature set based on the importance of the feature set and/or the channel That is, a differential number of quantization bits according to importance of each feature set and/or channel may be applied. For example, a relatively large number of quantization bits may be applied to a feature set and/or a channel having relatively high importance. On the other hand, a relatively small number of quantization bits may be applied to a feature set and/or a channel having relatively low importance. As such, by differentially applying the number of quantization bits based on the importance of the feature set and/or channel, quantization performance may be further improved.

The encoder 2030 may include a feature encoder 2031 and a side information encoder 2033.

The feature encoder 2031 may encode the quantized feature set by using a video/image coding technique such as prediction, transform, quantization, or the like.

The side information encoder 2033 may encode side information including an importance map and feature quantization-related information. Here, the feature quantization-related information may include the number of quantization bits and maximum and minimum values of feature elements.

In an embodiment, side information may be adaptively encoded based on spatiotemporal similarity between feature sets and/or channels. For example, the current importance map may be encoded/signaled through an exclusive or (XOR) operation with a previous importance map in encoding order. In addition, when the spatiotemporal similarity between feature sets and/or channels is relatively high, side information may be encoded/signaled in relatively large units (e.g., sequence or group of feature set (GOF) units). On the other hand, when the spatiotemporal similarity between feature sets and/or channels is relatively low, side information may be encoded/signaled in relatively small units (e.g., feature units). In addition, when the spatiotemporal similarity between feature sets and/or channels is relatively high, side information may be encoded/signaled as a difference from previous side information.

The feature set and side information encoded by the encoder 2030 may be included in one bitstream and output to the feature decoding apparatus.

FIG. 21 is a view illustrating a hierarchical structure of an encoded feature set.

Referring to FIG. 21, a bitstream 2100 may include a sequence header 2100, a group header 2120, a feature set header 2130 and a channel header 2140.

As described above, side information including an importance map and feature quantization-related information may be encoded/signaled in different units based on spatiotemporal similarity between feature sets and/or channels. For example, when side information is encoded in sequence units, the encoded side information may be included in the sequence header 2110. Alternatively, when side information is encoded in GOF units, the encoded side information may be included in the group header 2120. Alternatively, when side information is encoded in feature set units, the encoded side information may be included in the feature set header 2130. Alternatively, when side information is encoded in channel (or feature) units, the encoded side information may be included in the channel header 2140. Examples of each of the sequence header 2110, the group header 2120, the feature set header 2130, and the channel header 2140 are shown in FIGS. 22 to 25.

FIG. 22 is a view illustrating an example of a sequence header according to an embodiment of the present disclosure.

Referring to FIG. 22, a sequence header Sequence_header may include Adaptive_quantization, Sequence_level, Side_info and IM as syntax elements related to feature quantization.

The syntax element Adaptive_quantization may specify whether importance-based adaptive feature quantization/dequantization is applied to a current feature. For example, when Adaptive_quantization is true (or 1), importance-based feature quantization/dequantization may be applied to the current feature. On the other hand, when Adaptive_quantization is false (or 0), importance-based feature quantization/dequantization may not be applied to the current feature.

The syntax element Sequence_level may specify whether side information is encoded in sequence units when Adaptive_quantization is true (or 1). For example, when Sequence_level is true (or 1), side information may be adaptively encoded at the sequence level. On the other hand, when Sequence_level is false (or 0), side information may be adaptively encoded at a lower level.

The syntax elements Side_info and IM are signaled only when Sequence_level is true (or, 1), and may specify an acquisition location and method of side information and an importance map (IM).

FIG. 23 is a view illustrating an example of a group header according to an embodiment of the present disclosure.

Referring to FIG. 23, the group header GOF_header may include GOF_level, Side_info, IM, and GOF_info as syntax elements related to feature quantization. The syntax elements Side_info and IM are the same as those described above with reference to FIG. 25, and redundant descriptions will be omitted.

The syntax element GOF_level may specify whether side information is encoded in group of feature set (GOF) units when Adaptive_quantization is true (or 1) and Sequence_level is false (or 0). For example, when GOF_level is true (or 1), side information may be adaptively encoded at the GOF level. On the other hand, when Sequence_level is false (or 0), side information may be adaptively encoded at a lower level.

Syntax elements Side_info, IM and GOF_info may be signaled only when GOF_level is true (or, 1). The syntax element GOF_Info may specify configuration information and encoding mode of the GOF.

FIG. 24 is a view illustrating an example of a feature set header according to an embodiment of the present disclosure.

Referring to FIG. 24, a feature set header FeatureSet_header may include Adaptive_quantization, FeatureSet_level, Side_info, and IM as syntax elements related to feature quantization. The syntax elements Adaptive_quantization, Side_info, and IM are the same as those described above with reference to FIGS. 25 and 26, and redundant descriptions will be omitted.

The syntax element FeatureSet_level may specify whether side information is encoded in feature set units when Adaptive_quantization is true (or 1) and both Sequence_level and GOF_level are false (or 0). For example, when FeatureSet_level is true (or 1), side information may be adaptively encoded at the feature set level. On the other hand, when FeatureSet_level is false (or 0), side information may be adaptively encoded in a lower level.

Syntax elements Side_info and IM may be signaled only when FeatureSet_level is true (or 1).

Figures 25, 26:
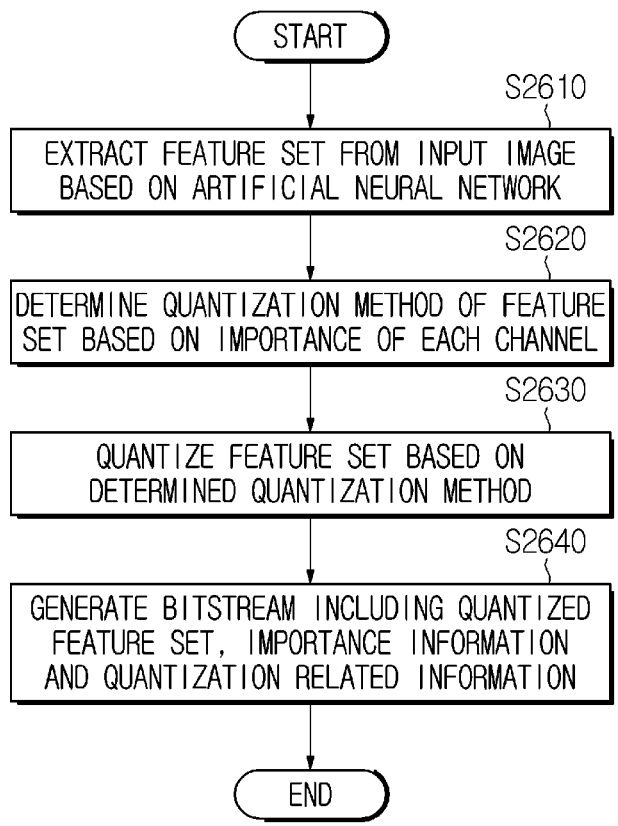
FIG. 25 is a view illustrating an example of a channel header according to an embodiment of the present disclosure.
FIG. 26 is a flowchart illustrating an image encoding method according to an embodiment of the present disclosure.

FIG. 25 is a view illustrating an example of a channel header according to an embodiment of the present disclosure.

Referring to FIG. 25, the channel header Channel_header may include Adaptive_quantization, Channel_level, Side_info, and IM as syntax elements related to feature quantization. The syntax elements Adaptive_quantization, Side_info, and IM are the same as those described above with reference to FIGS. 25 to 27, and redundant descriptions will be omitted.

The syntax element Channel_level may specify whether side information is encoded in channel (or feature) units when Adaptive_quantization is true (or 1) and Sequence_level, GOF_level and FeatureSet_level are all false (or 0). For example, when Channel_level is true (or 1), side information may be adaptively encoded at the channel level. On the other hand, when Channel_level is false (or 0), side information may be adaptively encoded at a lower level.

Syntax elements Side_info and IM may be signaled only when Channel_level is true (or 1). In this case, the IM may specify the importance of the current channel.

Hereinafter, an image encoding/decoding method according to an embodiment of the present disclosure will be described in detail with reference to FIGS. 26 to 28.

FIG. 26 is a flowchart illustrating an image encoding method according to an embodiment of the present disclosure.

The image encoding method of FIG. 26 may be performed by the source device of FIG. 7. For example, step S2610 may be performed by the feature extraction network 32, and steps S2620 to S2640 may be performed by the encoder 34.

Referring to FIG. 26, the source device may extract a feature set including a plurality of channels from an input image using an artificial neural network-based feature extraction method (S2610).

The artificial neural network may include a convolutional neural network (CNN) and a deep neural network (DNN). In order to extract the feature set, a predetermined activation function may be used in the artificial neural network. The activation function may be classified into a first activation function (e.g., Leaky Rectified Linear Unit (ReLU)) that shall signal both the maximum and minimum values of the feature elements and a second activation function (e.g., ReLU) that only needs to signal the maximum value of the feature elements.

The feature set may have different data distribution characteristics for each channel. However, consecutively extracted feature sets and/or channels may have the same/similar data distribution characteristics based on spatiotemporal similarity.

The source device may determine a quantization method of the feature set based on the importance of each of a plurality of channels in the feature set (S2620).

Each channel may have a different importance depending on the task purpose and the surrounding environment. For example, in a surveillance system, channels present in a region of interest (ROI) may have higher importance than channels present in a background area.

In an embodiment, for a feature set and/or channel with relatively high importance, information loss may be minimized by narrowing a quantization interval, and, for a feature set and/or channel with relatively low importance, the amount of information to be encoded may be minimized by widening the quantization interval. To this end, an Importance Map (IM) representing the importance of the feature set and/or the channel may be defined.

Quantization parameters used in the feature quantization operation may include maximum and minimum values of feature elements and the number of quantization bits.

In an embodiment, the maximum and minimum values of the feature elements may be determined on feature set units or channel units in consideration of a task purpose and coding efficiency.

In an embodiment, quantization parameters may not include a minimum value of feature elements depending on the type of activation function used for feature set extraction. For example, when the activation function applied to the current feature is a first activation function (e.g., Leaky ReLU), the quantization parameters may include a minimum value of the feature elements. On the other hand, when the activation function applied to the current feature is a second activation function (e.g., ReLU), the quantization parameters may not include the minimum value of the feature elements. In this case, the minimum value may be estimated as a lower limit value (e.g., 0) of the second activation function.

The number of quantization bits may be applied as the same value for all channels, or may be applied as a different value for each channel. This information may be encoded/signaled as global quantization information (e.g., global_quant).

In an embodiment, the number of quantization bits may be differentially determined based on the importance of each channel. For example, in the feature set, a relatively large number of quantization bits may be allocated to a region (or channel) having relatively high importance, and a relatively small number of quantization bits may be allocated to a region having relatively low importance.

In an embodiment, feature quantization may be performed based on a predetermined quantization group. Specifically, a quantization group including a plurality of quantization intervals may be defined based on the data distribution characteristic of the feature set. In addition, by transforming the feature element values of each channel in the feature set within the data range of any one of the quantization intervals, a feature quantization operation may be performed.

The source device may quantize the feature set based on the quantization method determined in step S2620 (S2630).

In some embodiments, a single quantization operation may be performed on all channels in the feature set, or an individual quantization operation may be performed on each channel in the feature set. Also, as described above, feature quantization may be performed based on a predetermined quantization group, and a specific method thereof is shown in FIG. 27.

Figure 27:
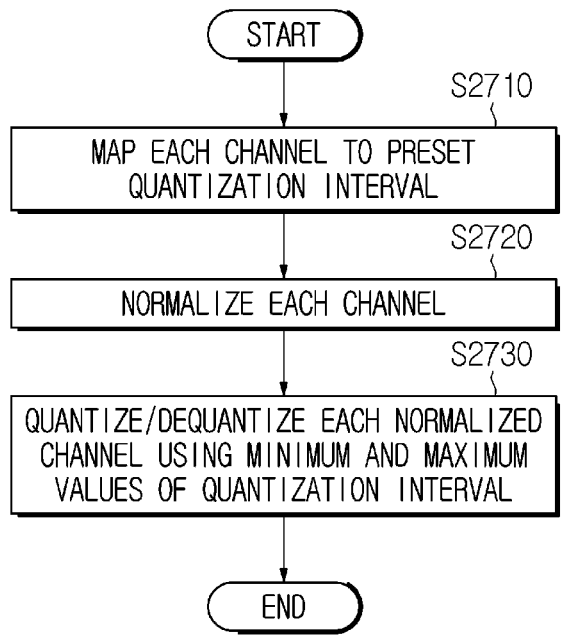
FIG. 27 is a flowchart illustrating a quantization group-based feature quantization method according to an embodiment of the present disclosure.

FIG. 27 is a flowchart illustrating a quantization group-based feature quantization method according to an embodiment of the present disclosure.

Referring to FIG. 27, the source device may map each channel in the feature set to a predetermined quantization interval in the quantization group (S2710). In an example, the mapping may be performed based on the similarity of the data range between each channel and the quantization interval. Each quantization interval in a quantization group is defined using a minimum value and a maximum value, and may be set based on the data distribution characteristics of the current feature.

The source device may normalize each channel in the feature set using the maximum and minimum values of the feature elements (S2720). Then, the source device may quantize each normalized channel by using the minimum and maximum values of the quantization interval mapped to each channel (S2730). In this case, an index value specifying a quantization interval used for the quantization may be encoded/signaled.

As described above, by quantizing the feature set based on a predetermined quantization group, there is no need to separately encode the number of quantized bits and the maximum and minimum values of the feature elements, so that the encoding/signaling efficiency can be further improved.

Referring to FIG. 26 again, the source device may generate a bitstream by encoding the quantized feature set, first information on the importance of each of the plurality of channels, and second information on the quantization method of the feature set (S2640). The second information may include the above-described quantization parameters, for example, maximum and minimum values of feature elements and the number of quantization bits.

In an embodiment, the first information about the importance of each of the plurality of channels and the second information on the quantization method of the feature set may be adaptively encoded based on data similarity between the feature sets and/or channels as side information for dequantization. For example, when data similarity between feature sets is relatively high, side information of the current feature set may be encoded as a difference from side information of a previous feature set preceding the current feature set in encoding order.

As described above, according to the image encoding method described above with reference to FIGS. 26 and 27, the feature set extracted from the input image may be adaptively encoded based on the importance of each channel in the feature set. Accordingly, quantization performance and encoding/signaling efficiency may be further improved.

Figure 28:
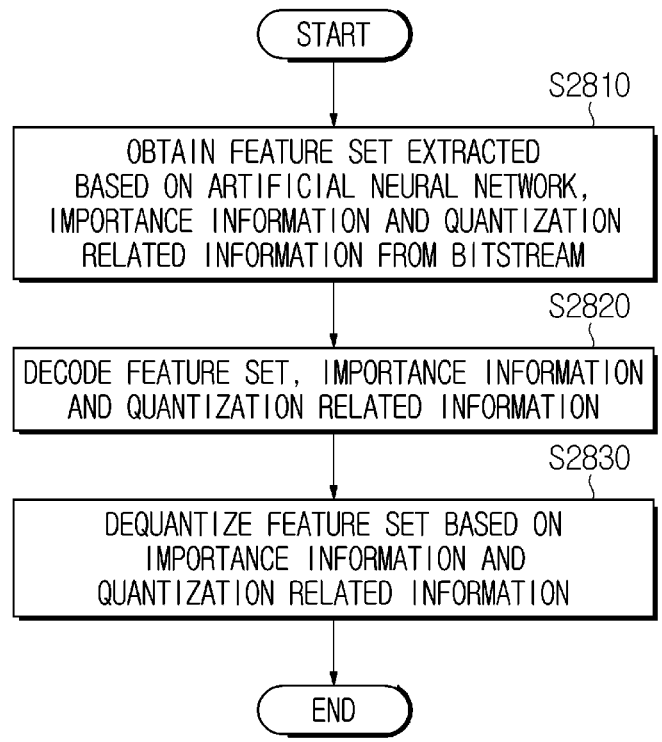
FIG. 28 is a flowchart illustrating an image decoding method according to an embodiment of the present disclosure.

FIG. 28 is a flowchart illustrating an image decoding method according to an embodiment of the present disclosure.

The image decoding method of FIG. 28 may be performed by the reception device of FIG. 7. For example, step S2810 may be performed by the receiver 41, and steps S2820 and S2830 may be performed by the decoder 42.

Referring to FIG. 28, the reception device may obtain, from a bitstream, a feature set extracted from the input image using an artificial neural network-based feature extraction method, first information on the importance of each of a plurality of channels included in the feature set, and second information on the quantization method of the feature set (S2810).

The importance may mean the priority of data/information necessary to perform a predetermined machine-oriented task. The first information on the importance of each channel may be expressed as a predetermined importance map (IM).

In an embodiment, the first information on the importance of each of the plurality of channels in the feature set and the second information on the quantization method of the feature set may have a predetermined decoding unit. For example, the first information and the second information may be decoded in any one of a sequence unit, a group of feature set (GOF) unit, a feature set unit, or a channel unit. The decoding unit may be determined based on data similarity between the current feature set and a previous feature set preceding the current feature set in decoding order. For example, when the data similarity is relatively large, the decoding unit may be determined in relatively large units (e.g., sequence units, GOF units). On the other hand, when the data similarity is relatively small, the decoding unit may be determined in relatively small units (e.g., channel units).

In an embodiment, the second information on the quantization method of the feature set may include the number of quantization bits of each of a plurality of channels in the feature set. The number of quantization bits may have a value proportional to the importance of each of the plurality of channels. For example, when the importance of each of the plurality of channels is relatively high, the number of quantization bits may have a relatively large value. On the other hand, when the importance of each of the plurality of channels is relatively low, the number of quantization bits may have a relatively small value. Meanwhile, the second information may further include maximum and minimum values of feature elements for each channel. In this case, the minimum value may be selectively decoded based on the type of activation function used in the artificial neural network. For example, when the activation function is a first activation function (e.g., Leaky ReLU), the minimum value may be determined to be a value obtained from a bitstream. On the other hand, when the activation function is a second activation function (e.g., ReLU), the minimum value may be estimated as a lower limit value (e.g., 0) of the second activation function. In this case, a separate decoding process for the minimum value may be skipped.

In an embodiment, the first information on the importance of each of the plurality of channels in the feature set and the second information on the quantization method of the feature set may have a predetermined value adaptively determined based on data similarity between the feature sets and/or channels. For example, when the data similarity is relatively high, the first information may have a result value of an exclusive or (XOR) operation with information on the importance of a previous feature set preceding the current feature set in decoding order. Also, in this case, the second information may have a difference value from information on the quantization method of the previous feature set preceding the current feature set in decoding order.

The reception device may decode the feature set, first information, and second information obtained from the bitstream (S2820). In order to improve decoding efficiency, the reception device may perform a series of procedures such as dequantization, inverse transform, and prediction corresponding to the operation of the source device.

The receiving device may reconstruct the feature set by dequantizing the decoded feature set based on the decoded first information and second information (S2830).

In an embodiment, feature dequantization may be performed based on a predetermined quantization group. Specifically, the reception device may configure the same quantization group as the quantization group configured in the source device based on the number of quantization intervals received from the source device, and the minimum and maximum values for each interval. Alternatively, the reception device may configure a quantization group based on data distribution characteristics of the reconstructed feature sets. In addition, the reception device may dequantize the current feature based on the quantization interval identified by the quantization interval index information received from the source device. Meanwhile, the minimum value may be selectively decoded based on the type of activation function used in the artificial neural network. For example, when the activation function is a second activation function (e.g., ReLU), the minimum value is estimated as a lower limit value (e.g., 0) of the second activation function, and a separate decoding process for the minimum value may be skipped.

As described above, according to the image decoding method described above with reference to FIG. 28, the feature set extracted from the input image may be adaptively decoded based on the importance of each channel. Accordingly, dequantization performance and decoding efficiency may be further improved.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 29:
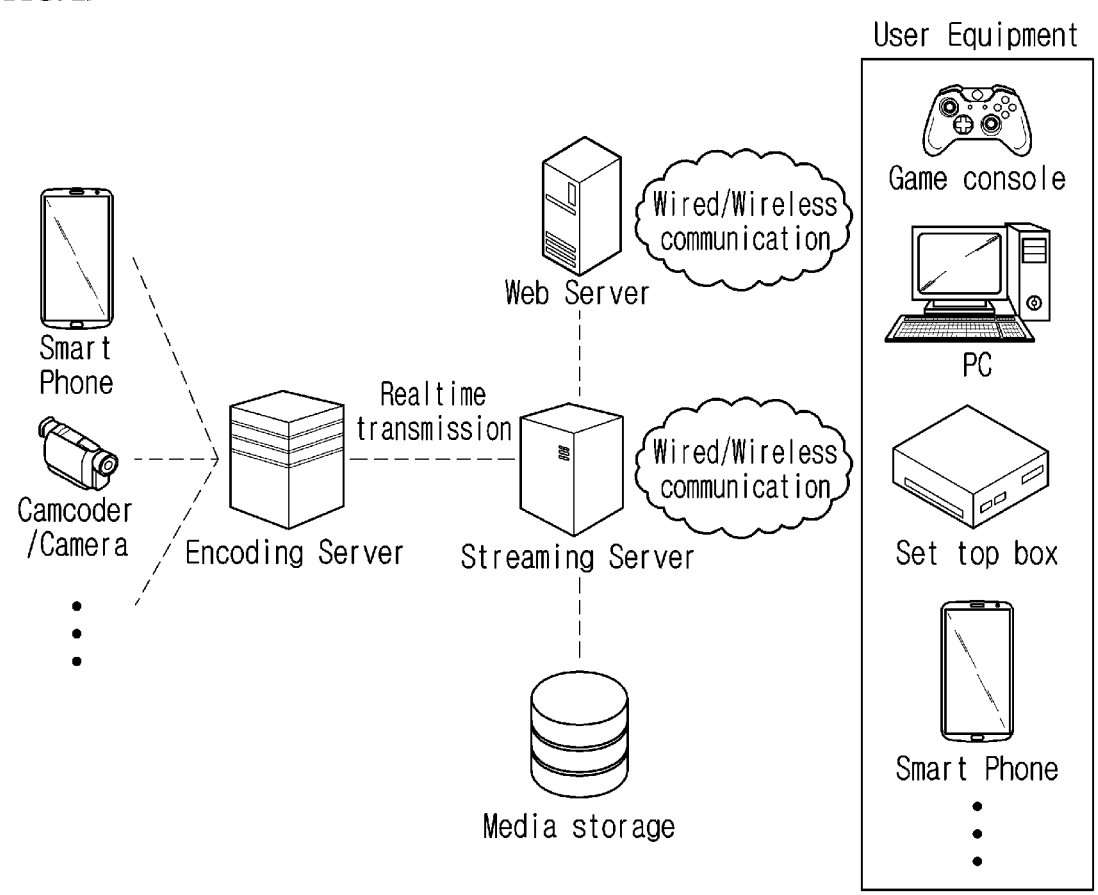
FIG. 29 is a view showing an example of a content streaming system, to which embodiments of the present disclosure are applicable.

FIG. 29 is a view illustrating an example of a content streaming system, to which embodiments of the present disclosure are applicable.

Referring to FIG. 29, the content streaming system, to which the embodiment of the present disclosure is applied, may largely include an encoding server, a streaming server, a web server, a media storage, a user device, and a multimedia input device.

The encoding server compresses contents input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the contents streaming system may include a separate control server. In this case, the control server serves to control a command/response between devices in the contents streaming system.

The streaming server may receive contents from a media storage and/or an encoding server. For example, when the contents are received from the encoding server, the contents may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the contents streaming system may be operated as a distributed server, in which case data received from each server may be distributed.

Figure 30:
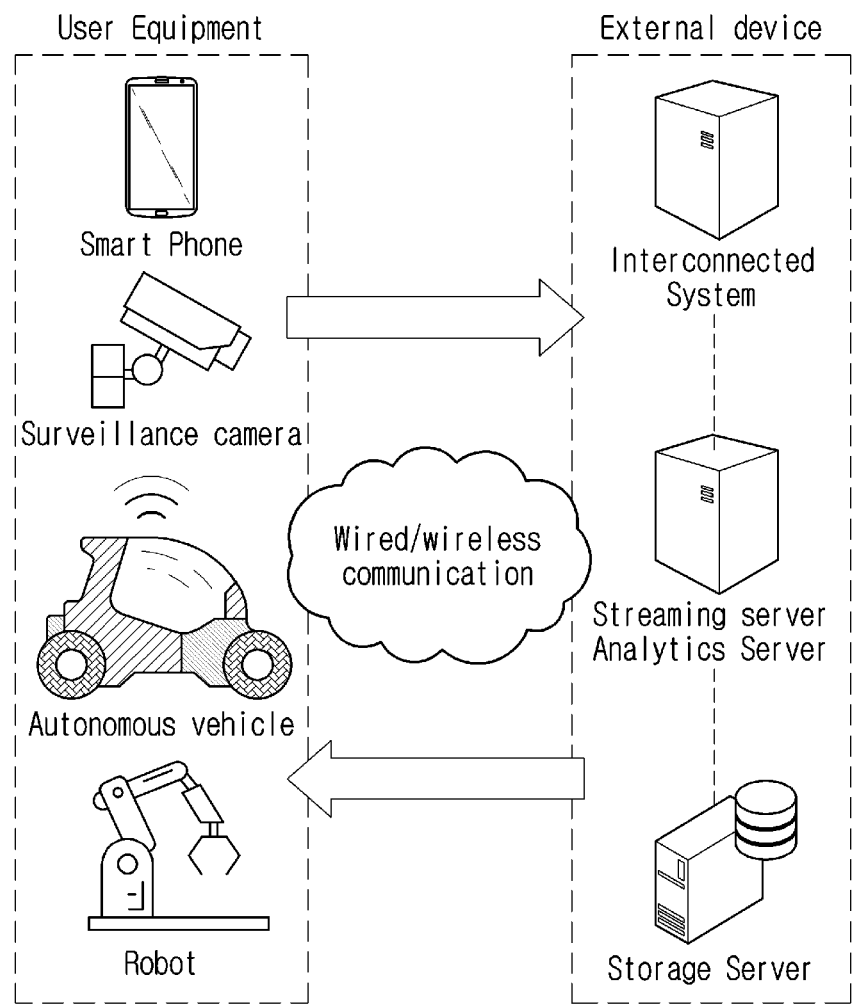
FIG. 30 is a view showing another example of a content streaming system, to which embodiments of the present disclosure are applicable.

FIG. 30 is a diagram illustrating another example of a content streaming system to which embodiments of the present disclosure are applicable.

Referring to FIG. 30, in an embodiment such as VCM, a task may be performed in a user terminal or a task may be performed in an external device (e.g., streaming server, analysis server, etc.) according to the performance of the device, the user's request, the characteristics of the task to be performed, etc. In this way, in order to transmit information necessary to perform a task to an external device, the user terminal may generate a bitstream including information necessary to perform the task (e.g., information such as task, neural network and/or usage) directly or through an encoding server.

In an embodiment, the analysis server may perform a task requested by the user terminal after decoding the encoded information received from the user terminal (or from the encoding server). At this time, the analysis server may transmit the result obtained through the task performance back to the user terminal or may transmit it to another linked service server (e.g., web server). For example, the analysis server may transmit a result obtained by performing a task of determining a fire to a fire-related server. In this case, the analysis server may include a separate control server. In this case, the control server may serve to control a command/response between each device associated with the analysis server and the server. In addition, the analysis server may request desired information from a web server based on a task to be performed by the user device and the task information that may be performed. When the analysis server requests a desired service from the web server, the web server transmits it to the analysis server, and the analysis server may transmit data to the user terminal. In this case, the control server of the content streaming system may serve to control a command/response between devices in the streaming system. The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:
1. An image decoding method performed by an image decoding apparatus, the image decoding method comprising:
obtaining, from a bitstream, a feature set extracted from an input image using an artificial neural network-based feature extraction method, first information on impor- tance of each of a plurality of channels included in the feature set and second information on a quantization method of the feature set;

decoding the feature set, the first information and the second information; and dequantizing the decoded feature set based on the decoded first information and the decoded second information, wherein the second information comprises a number of quantization bits of each of the plurality of channels, wherein the number of quantization bits is determined based on the importance of each of the plurality of channels, wherein the first information and the second information have a decoding unit, wherein the decoding unit is determined to be one of a sequence unit, a group of feature set (GOF) unit, a feature set unit or a channel unit, and wherein the decoding unit is determined based on data similarity between the feature set and a previous feature set preceding the feature set in decoding order.

2. The image decoding method of claim 1, wherein the number of quantization bits has one value selected based on the importance of each of the plurality of channels from among a plurality of preset values.

3. The image decoding method of claim 1, wherein the second information comprises a minimum value of each of the plurality of channels, based on an activation function used to extract the feature set being a first activation function.

4. The image decoding method of claim 1, wherein a minimum value of each of the plurality of channels is set to a lower limit value of a second activation function, based on an activation function used to extract the feature set being the second activation function.

5. The image decoding method of claim 1, wherein the feature set is dequantized based on a predetermined quantization group comprising a plurality of quantization intervals.

6. An image decoding apparatus comprising a memory and at least one processor, wherein the at least one processor is configured to:
obtain, from a bitstream, a feature set extracted from an input image using an artificial neural network-based feature extraction method, first information on importance of each of a plurality of channels included in the feature set and second information on a quantization method of the feature set;

decode the feature set, the first information and the second information; and dequantize the decoded feature set based on the decoded first information and the decoded second information, wherein the second information comprises a number of quantization bits of each of the plurality of channels, wherein the number of quantization bits is determined based on the importance of each of the plurality of channels, wherein the first information and the second information have a decoding unit, wherein the decoding unit is determined to be one of a sequence unit, a group of feature set (GOF) unit, a feature set unit or a channel unit, and wherein the decoding unit is determined based on data similarity between the feature set and a previous feature set preceding the feature set in decoding order.

7. An image encoding method performed by an image encoding apparatus, the image encoding method comprising:

extracting a feature set comprising a plurality of channels from an input image using an artificial neural network-based feature extraction method;

determining a quantization method of the feature set, based on importance of each of the plurality of channels;

quantizing the feature set based on the determined quantization method; and encoding the quantized feature set, first information on the importance and second information on the quantization method, wherein the second information comprises a number of quantization bits of each of the plurality of channels, wherein the number of quantization bits is determined based on the importance of each of the plurality of channels, wherein the first information and the second information have an encoding unit, wherein the encoding unit is one of a sequence unit, a group of feature set (GOF) unit, a feature set unit or a channel unit, and wherein the encoding unit is determined based on data similarity between the feature set and a previous feature set preceding the feature set in encoding order.

8. The image encoding method of claim 7, wherein the first information is encoded as a difference from information on importance of a previous feature set preceding the feature set in encoding order, and wherein the second information is encoded as a difference from information on a quantization method of the previous feature set.

9. The image encoding method of claim 7, wherein the feature set is quantized based on a predetermined quantization group comprising a plurality of quantization intervals.

10. The image encoding method of claim 9, wherein the quantizing the feature set comprises:

mapping each of the plurality of channels to any one of the plurality of quantization intervals;

normalizing each of the plurality of channels; and quantizing each of the plurality of normalized channels using a minimum value and maximum value of the quantization interval mapped to each of the plurality of channels.

11. The image encoding method of claim 10, wherein the second information comprises index information specifying the quantization interval mapped to each of the plurality of channels.

12. A computer-readable recording medium storing a bitstream generated according to the image encoding method of claim 7.

* * * * *